US011904192B2

(12) United States Patent
Fu

(10) Patent No.: US 11,904,192 B2
(45) Date of Patent: Feb. 20, 2024

(54) VERSATILE AND MULTI-PURPOSE BREATHING MASK

(71) Applicant: AIMWELL HOLDING PTY LTD, New South Wales (AU)

(72) Inventor: Xiaoyi Fu, New South Wales (AU)

(73) Assignee: AIMWELL HOLDING PTY LTD, New South Wales (AU)

(*) Notice: Subject to any disclaimer, the term of this patent is extended or adjusted under 35 U.S.C. 154(b) by 0 days.

(21) Appl. No.: 16/644,005

(22) PCT Filed: Sep. 28, 2018

(86) PCT No.: PCT/AU2018/051068
§ 371 (c)(1),
(2) Date: Mar. 3, 2020

(87) PCT Pub. No.: WO2019/071296
PCT Pub. Date: Apr. 18, 2019

(65) Prior Publication Data
US 2020/0406069 A1 Dec. 31, 2020

(30) Foreign Application Priority Data
Oct. 13, 2017 (AU) ................................ 2017904134

(51) Int. Cl.
*A62B 7/10* (2006.01)
*A62B 9/00* (2006.01)
(Continued)

(52) U.S. Cl.
CPC ................ *A62B 7/10* (2013.01); *A62B 9/006* (2013.01); *A62B 18/006* (2013.01);
(Continued)

(58) Field of Classification Search
CPC ......... A62B 7/10; A62B 9/006; A62B 18/006; A62B 18/084; A62B 23/02; A62B 18/10;
(Continued)

(56) References Cited

U.S. PATENT DOCUMENTS 5,372,130 A 12/1994 Stern et al.
5,374,458 A 12/1994 Burgio
9,067,086 B2 6/2015 Danford
2012/0130153 A1* 5/2012 Bolyard .............. A61M 60/585 318/400.34
2013/0269814 A1* 10/2013 Mayr ......................... F17C 5/00 138/30

(Continued)

FOREIGN PATENT DOCUMENTS

CN 102781520 11/2012
CN 106300713 1/2017

(Continued)

OTHER PUBLICATIONS

Around, Merriam-Webster Dictionary, https://www.merriam-webster.com/dictionary/around; Accessed on Mar. 16, 2023. 2023.*

*Primary Examiner* — Kendra D Carter
*Assistant Examiner* — Maap Ahmed Ellabib
(74) *Attorney, Agent, or Firm* — Levine Bagade Han LLP

(57) ABSTRACT

In one aspect of the present invention, there is provided a modular respirator comprising an elongate filter unit having a filter inlet, a filter a filter outlet, and a replaceable fluid filter for filtering pollutants within the fluid. The elongate exhaust unit having an exhaust inlet, an exhaust outlet, and one or more one-way valves. A mask assembly having a mask for covering the oral and nasal passage of a user, a mask inlet at one end of the mask, a mask outlet at an opposite end of the mask, wherein the mask inlet is releasably fastened to the filter outlet, and the mask outlet is releasably fastened to the exhaust inlet.

20 Claims, 26 Drawing Sheets

(51) Int. Cl.

| | |
|---|---|
| ***A62B 18/00*** | (2006.01) |
| ***A62B 18/08*** | (2006.01) |
| ***A62B 23/02*** | (2006.01) |
| ***A62B 18/10*** | (2006.01) |

(52) U.S. Cl.
CPC ............ *A62B 18/084* (2013.01); *A62B 23/02* (2013.01); *A62B 18/10* (2013.01)

(58) Field of Classification Search
CPC .. A62B 7/00; A62B 9/00; A62B 18/00; A62B 23/00; A62B 18/02; A62B 2017/00323; A62B 2017/00327; A61M 16/00; A41D 13/11; A63B 23/18; A63B 2230/435; H02G 3/00; H02G 3/04; H02G 3/0468; H02G 3/06; H02G 3/021
USPC ............ 128/205.27, 205.29, 206.12, 206.19, 128/206.13, 206.14, 206.15, 206.16, 128/206.17, 206.18
See application file for complete search history.

(56) References Cited

U.S. PATENT DOCUMENTS

| | | | | |
|---|---|---|---|---|
| 2014/0197632 | A1* | 7/2014 | Hennemann .......... | F16L 37/091 285/319 |
| 2014/0373846 | A1 | 12/2014 | Kao et al. | |
| 2015/0290478 | A1 | 10/2015 | Curran | |

FOREIGN PATENT DOCUMENTS

| | | | | |
|---|---|---|---|---|
| CN | 106823181 | | 6/2017 | |
| CN | 105209811 | B | 7/2017 | |
| CN | 106924940 | | 7/2017 | |
| EP | 2453989 | B1 | 5/2012 | |
| WO | WO 2003/099385 | | 12/2003 | |
| WO | WO 2011/006206 | A1 * | 1/2011 | |
| WO | WO-2013082650 | A1 * | 6/2013 | ............... A61F 9/02 |
| WO | WO 2016/112434 | | 7/2016 | |
| WO | WO 2017/065620 | | 4/2017 | |

* cited by examiner

VERSATILE AND MULTI-PURPOSE BREATHING MASK

CROSS-REFERENCE TO RELATED APPLICATIONS

This application is a U.S. national application filed under 35 U.S.C. § 371 to International Application No. PCT/AU2018/051068 filed Sep. 28, 2018, which claims the benefit of priority to Australian Patent Application No. 2017904134 filed Oct. 13, 2017, the contents of which are incorporated herein by reference in their entirety.

The present invention relates to a breathing apparatus or respirator, and in particular, adapted for use in recreational activities or as a sports training mask.

BACKGROUND

In the 21st century, increasingly people are becoming more active, health conscious and taking up various sports and recreational activities, such as running, cycling, triathlon, gym workouts, etc. There are many types of sporting or recreational equipment that are available to meet these sports training needs. One of the relatively new additions to these types of recreational equipment is a type of inspiratory muscle training respiration masks. Essentially, the masks add inspiratory resistance by restricting the airflow to the masks while doing exercise, and the wearers need to overcome this added resistance to breathe in air enough to provide the oxygen needed for the body to function. Depending on the level of difficulties, the wearer is required to breathe harder than he or she normally does, thus loading the inspiratory muscles associated with breathing. Research has found that this type of training mask is effective to boost lung capacity, strengthen breathing muscles and improve overall fitness.

There are a number of issues/potential improvements with the currently available sports training masks:

- Difficulty with washing the associated straps (for example most are hand wash only): given the user is likely to be sweating, it is generally difficult to wash or clean previously known masks.
- Previously known masks have been generally too bulky on the user's face.
- Lack of proper air filtering, in case the training is conducted in polluted environment.
- The real resistance level of each setting varies with the altitude of the user, and there is no way to automatically adjust the resistance according to the altitude at the training.
- There is generally no practical way to measure and record the breathing performance, such as breathing rate, inhalation to exhalation ratio, tidal volume, etc., so that one can have an idea how the training goes, and what need to be changed or work on to improve breathing efficiency, etc.

The most commonly used personal respiratory protection mask type today is paper mask, and "N95" is one of the popular standards to define a class of such a mask type. Most paper masks are simple and light, however, their protection efficiency can be easily compromised by air gaps between the mask and the face.

U.S. Pat. No. 5,374,458 disclosed a "N95" type mask. This patent disclosed a molded, cup-shaped face mask for medical and dental personnel. The mask had a first, second and third layer. Edge portions of the layers were substantially free of adhesion to one another, and outer edges of the mask were free of any peripheral seal or the like, so that the edge portions of all three layers were movable relative to each other and present a soft, comfortable feel to the wearer. Exhalation of air through the mask was facilitated by the flexible nature of the edge portions, and during inhalation the flexible edge portions were drawn toward a position of conformed contact with the wearer's face.

An air purifying respirator, or APR, is an upgrade to N95 type of passive masks with improved facial seal and filter efficiency and dust capacity. However, it is still a passive mask, and like N95 masks, one has to make extra effort to breathe through the filter media; a fair part of the used air gets rebreathed, increasing the $CO_2$, moisture and temperature in the mask; all these resulting in discomfort over long period of use.

U.S. Pat. No. 9,067,086 disclosed a wearable training mask providing varied inhalation resistance settings. The mask includes a depth defining and air impermeable body having an exterior surface and an interior surface exhibiting a perimeter extending seal such that the body is adapted to overlay a wearer's mouth and nose. A plurality of air admittance valve subassemblies are provided and incorporated into locations along the body. Each of the valve subassemblies exhibit multiple resistance settings for affecting a degree of air flow into the mask in response to inhalation by the wearer. Straps extending from said body have inter-engaging ends affixing about the wearer's head. This mask cannot automatic adjust the air flow to suit different user in different environment or altitude. This mask lacks the mechanically ability to assist the air ventilation of the user within the mask. Further this mark does not provide any air filters to block or limit pollutants entering the airways of the user.

A powered air purifying respirator, or PAPR, are generally used in heavily polluted or hazardous industrial environment. A typical PAPR uses power to draw ambient air from the atmosphere through a filter element, to pressurize it, and transfer it to the airways of the user via a conduit and mask. A PAPR ensures that the supply of air remains filtered or purified under all circumstances by maintaining a positive pressure inside the mask. As a result, the protection efficiency can be maintained high, and the CO2 and moisture in the mask can be kept low, thus a PAPR can provide a much better protection and breathing comfort than a paper mask, especially for a prolonged use.

US Patent Application No. 2014/0373846 disclosed a breathing apparatus, comprising: a filter arranged to provided filtered air entering the breathing apparatus to a user; an air flow generator arranged to receive and pressurize the filtered air; a bypass valve arranged to allow the filtered air to allow the filtered air to pass therethrough; a mask for providing the filtered air to an airway of the user; and a manifold having a first pathway for allowing filtered air via the air flow generator, a second pathway for allowing filtered air via the bypass valve, the second pathway being arranged to allow the filtered air to avoid air flow generator, and an outlet in fluid communication with the mask, whereby the filtered air is provided to the mask through the air flow generator or the bypass valve.

However, the prior art PAPR systems were specified solely for industrial and professional applications. That is, they have not been designed for use by the general public in everyday situations. Therefore, most PAPR systems are typically big, bulky, heavy and expensive.

In recent years, the demand for a better respiratory protection mask for general public for recreational activities has been strong. In particular, many Chinese cities suffer from severe smog and particulate air pollution across each year, and good quality paper masks are often sold out or not practical for physical activities such as running or exercising.

A number of low performance powered or "hybrid" masks have become available. Most of these hybrid masks have the blower, battery, control electronics and filter media all fitted in the mask body. In a sense, they have the form factor of a typical paper mask, and they produce some motorised air to the mask, which helps to flush out the used air thus improving some comfort. However, the main shortcoming of these hybrid masks is that the air flow is normally not sufficient to meet the breathing demand for high exertion activities, such as in outdoor running and cycling sports. Further, most of these hybrid masks do not meet the recognised relevant international standard for a PAPR due to the low flow capability. Therefore, these hybrid masks cannot be used in demanding and serious applications.

SUMMARY

It is an objection for the present invention to provide a respirator for sport.

It is another object of the present invention to provide an improvement of mask to transform industrial air purifying respirator (APR) and powered air purifying respirators (PAPR) to a low profile design, which is smaller, lighter, easier to wear, more comfortable, aesthetically pleasing, affordable and suitable for sports training purpose.

It is another object of the present invention to provide an improvement of mask that is effective and convenient to operate in a variety of applications other than sports, including everyday applications, in hospitals, as well as on some worksites and light industrial situations.

It is, therefore, an object of the present invention to provide a new and novel respirator for sport.

Other objectives and advantages will become apparent when taken into consideration with the following specification and drawings.

It is also an object of the present invention to overcome or ameliorate at least one of the disadvantages of the prior art, or to provide a useful alternative.

In one aspect of the present invention, there is provided a modular respirator comprising:

- an elongate filter unit having a filter inlet, a filter outlet, and a replaceable fluid filter for filtering pollutants within the fluid;
- an elongate exhaust unit having an exhaust inlet, an exhaust outlet, and one or more one-way valves;
- a mask assembly having a mask for covering the oral and nasal passage of a user, a mask inlet at one end of the mask, a mask outlet at an opposite end of the mask, wherein the mask inlet is releasably fastened to the filter outlet, and the mask outlet is releasably fastened to the exhaust inlet,
- such that the filter unit is located around an anterior triangle on one side of a neck and the exhaust unit is located around an anterior triangle on an opposite side of the neck, wherein the filter unit, the mask and the exhaust unit jointly form a tightly sealed passage for fluid to pass therethrough.

Preferably, the modular respirator further comprises:

- a blower unit having a blower inlet, a blower outlet and an electric blower for driving fluid from the blower inlet to the blower outlet; and
- a controlling unit having a power unit and a controller for controlling the blower,
- wherein the blower outlet is releasably connected with the filter inlet of the filter unit, and the controlling unit is reliably connected to the exhaust unit.

Preferably, the modular respirator further comprises a neck band joining the blower unit and the controlling unit.

Preferably, the power unit is adapted to supply power to the electric blower via an electric cable passing through the neck band.

Preferably, the controller is in communication with the electric blower through an electric cable passing through the neck band.

Preferably, the controller is in communication with the electric blower through wireless communication.

Preferably, the neck band is selectively adjustable by the user.

Preferably, the neck band comprises an inner sleeve joining one of the blower unit and controlling unit, an outer sleeve joining the other of the blower unit and controlling unit, such that the inner sleeve is movable within the outer sleeve.

Preferably, the neck band comprising a latch for fastening the inner sleeve with the outer sleeve on a fix position.

Preferably, the electric cable is a coiled cable.

Preferably, the inner sleeve has a lumen adapted to allow the electric cable to pass therethrough.

Preferably, the blower unit comprises a blower unit enclosure adapted to hold an electric blower, and a pre-filter.

Preferably, the electric blower comprises a blower enclosure housing an electric motor attached to an impeller.

Preferably, the electric motor is a brushless direct current electric motor.

Preferably, the electric motor comprises a stator with a plurality of protruding ribs.

Preferably, electric motor comprises a plurality of body vane for supporting the electric motor inside the electric blower and directing a fluid to pass therethrough.

Preferably, the impeller comprises a substantially conical stem, and a plurality of impeller vanes extending radially from the stem.

Preferably, the impeller can produce reverse air flow when rotates in reverse direction.

Preferably, the blower enclosure comprises a front shell releasably connected to a rear shell, such that the electric motor is adapted to securely fit inside the blower enclosure.

Preferably, the front shell comprises an aperture adapted to allow fluid to pass therethrough.

Preferably, the rear shell comprises an aperture for cables connected to the electric motor to pass through, and at least one aperture for fluid to pass therethrough.

Preferably, the front shell comprises at least one male snap-fit members to releasable engage with a corresponding female snap-fit members of the rear shell.

Preferably, the front shell is releasably secured to the rear shell with screws.

Preferably, the blower unit further comprises a filter cover covering the pre-filter.

Preferably, the pre-filter is adapted to filter particulars with particular size of over 0.3 μm.

Preferably, the blower unit enclosure comprising a top shell removably engages with a bottom shell, such that the electric blower and the pre-filter are securely fit inside the blower unit.

Preferably, the top shell comprises at least one male snap-fit members to releasable engage with a corresponding female snap-fit members of the bottom shell.

Preferably, the top shell is releasably secured to the bottom shell with screws.

Preferably, the controlling unit comprises one or more user interfaces displaying the status of the modular respirator.

Preferably, one of the user interface comprises a plurality of light emitting diodes.

Preferably, one of the user interface digital display screen.

Preferably, one of the user interface comprises a touch screen.

Preferably, the controlling unit comprises a power switch for switching the modular respirator on or off.

Preferably, the power unit comprises a rechargeable battery.

Preferably, the rechargeable battery is a Lithium ion battery.

Preferably, the filter unit comprises a serviceable case for accessing the fluid filter.

Preferably, the filter outlet comprises a pipe thread joint for fastening a corresponding pipe thread joint on the inlet of the mask assembly.

Preferably, the filter outlet is adapted to receive an elastic spacer inside the pipe thread joint.

Preferably, the fluid filter has a conical shape.

Preferably, the filter unit comprises one of the male push-fit connector or female push-fit connector for connecting a complementary push-fit connector.

Preferably, the male push-fit connector comprises stud having a locking groove for receiving a locking latch.

Preferably, the female push-fit connector comprises a socket adapted to releasable engage with the stud, wherein the socket has one or more spring-loaded latch for latching upon the locking groove of the stud.

Preferably, the female push-fit connector comprising a spring-loaded ring for releasing the spring-loaded latch from the locking groove.

Preferably, the male and female push-fit connector comprises a pipe thread connector to engage with a complementary pipe thread connector.

Preferably, the exhaust unit comprises a pipe thread connector at the exhaust inlet for connecting to a complimentary pipe thread connector at the mask outlet.

Preferably, the exhaust unit comprises a mounting plate for supporting the one-way valves.

Preferably, the exhaust unit comprises a filter compartment for housing an exhalation filter.

Preferably, the filter compartment is located at the exhaust outlet.

Preferably, the filter compartment has a mesh opening.

Preferably, the mesh opening comprises a resistance dial for controlling air flow exit from the exhaust unit.

Preferably, the exhaust unit has one of the male and female push-fit connector adapted to engage a complimentary push-fit connector.

Preferably, the exhaust unit has a pressure port to interface with a pressure sensor.

Preferably, the modular respirator further comprises a neck band assembly having first stub attached to one end of a neck band, and a second stub attached to another end of the neck band, wherein the first stub and the second stub are adapted to engage with a push-fit connector.

Preferably, the first stub comprises an adjustment means for adjusting the inhalation resistance of the fluid.

Preferably, second stub comprises a pressure sensor for sensing the pressure of the fluid inside the mask.

Preferably, the neck band assembly comprises a adjusting means for adjusting the length of the neck band.

Preferably, the neck band comprises a sleeve adapted to allow a coil cable to fit therethrough.

Preferably, the sleeve is made of elastic materials.

Preferably, the modular respirator further comprises one or more head band.

Preferably, the mask assembly comprises one or more hooks located towards the top, bottom, or centre of mask assembly, wherein the hooks are adapted to engage with pull-over bands for securing the mask assembly on the user.

Preferably, the modular respirator further comprising one or more sensing devices, wherein the sensing device has a self-sustained controller and power supply.

Preferably, the sensing devices is adapted to measure $CO_2$ concentration level.

In a second aspect of the present invention, there is provided a modular respirator comprising:

- an elongate filter unit having a filter inlet, a filter outlet, a filter element and pre-filter for filtering pollutants within a fluid;
- an elongate controlling unit having a power unit and a controller for controlling a blower unit, an air path having a seal at one end allowing air communicable from the blower unit to a mask assembly, and having a thread connector at both ends of the blower unit;
- a mask assembly having a mask cover for covering an oral and nasal passage of a user, at least one exhalation assembly, a mask inlet tread connector located at one end of the mask, a mask quick connect interface at an opposite end of the mask assembly, wherein the mask inlet is releasably fastened to the controlling unit, and the mask quick connect interface is releasably fastened to the filter push-fit connector.

Preferably, the blower unit is adapted to be placed at a person's back of the person's neck having an air pipe, an electric blower for driving fluids from a blower inlet to a blower outlet.

Preferably, the air pipe is connected between the filter unit and the controlling unit, and is made of rubber having a section of bellows at each side of the tube.

Preferably, the air pipe is adapted to be a fastening mechanism for the respirator.

Preferably, the modular respirator further comprises a coiled electrical cable for conducting electricity to the blower unit.

Preferably, the controlling unit has a thread connector at an inlet end and a push-fit connector at an outlet end; the mask assembly has a quick connect interface at each end of the mask.

Preferably, the air pipe comprises a thread connector assembly adapted to adjust a length of the air pipe and to releasably fasten to the controlling unit and the filter unit.

In another aspect, the present invention transforms industrial air purifying respirator (APR) and powered air purifying respirators (PAPR) to a low profile design, which is smaller, lighter, easier to wear, more comfortable, aesthetically pleasing, affordable and suitable for sports training purpose. The present invented mask also seeks to be effective and convenient to operate in a variety of applications other than sports, including everyday applications, in hospitals, as well as on some worksites and light industrial situations.

BRIEF DESCRIPTION OF THE FIGURES

Features and advantages of the present invention will become apparent from the following description of embodiments thereof, by way of example only, with reference to the accompanying drawings, in which.

DESCRIPTION OF THE INVENTION

Figure 1:
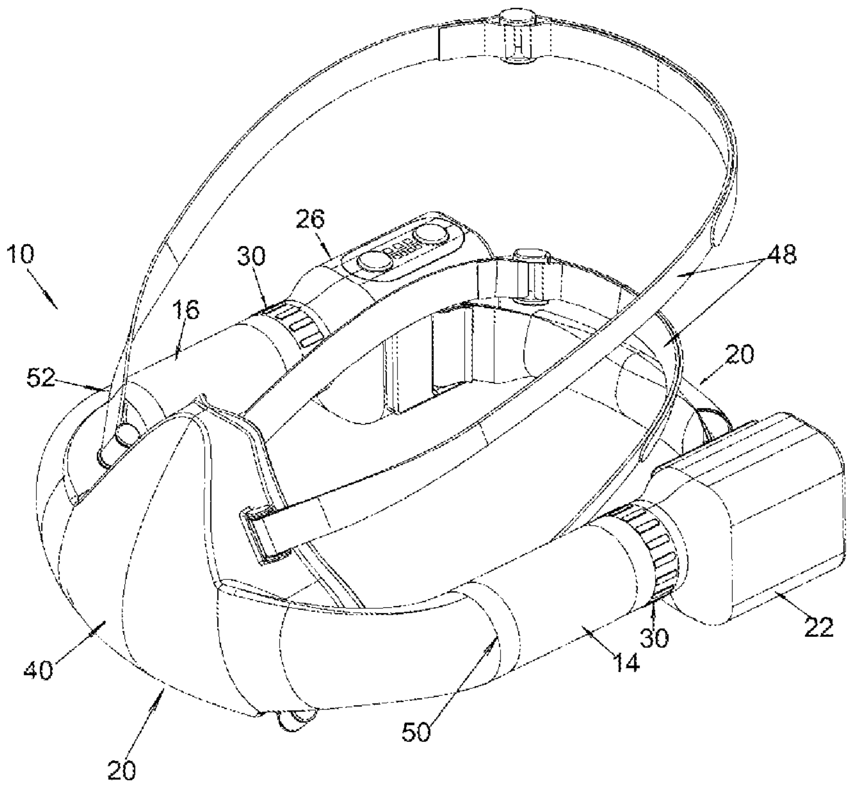
FIG. 1 shows a perspective view of a respirator in power version of an embodiment of the present invention.
Figure 2:
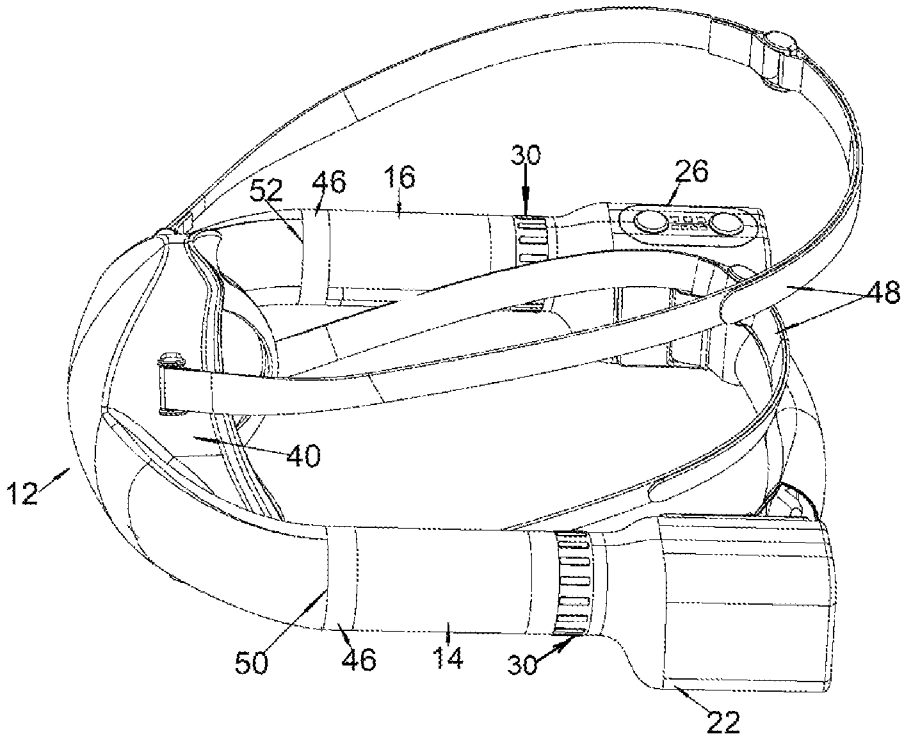
FIG. 2 shows another perspective view of a respirator of FIG. 1.
Figure 3:
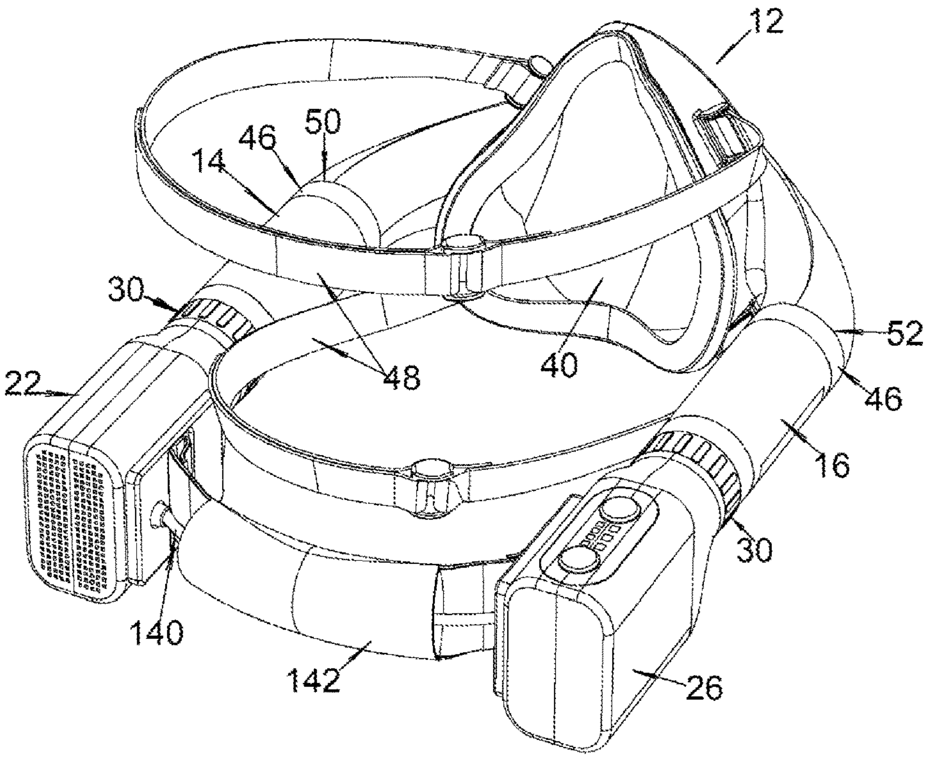
FIG. 3 shows another perspective view of a respirator of FIG. 1.
Figure 4:
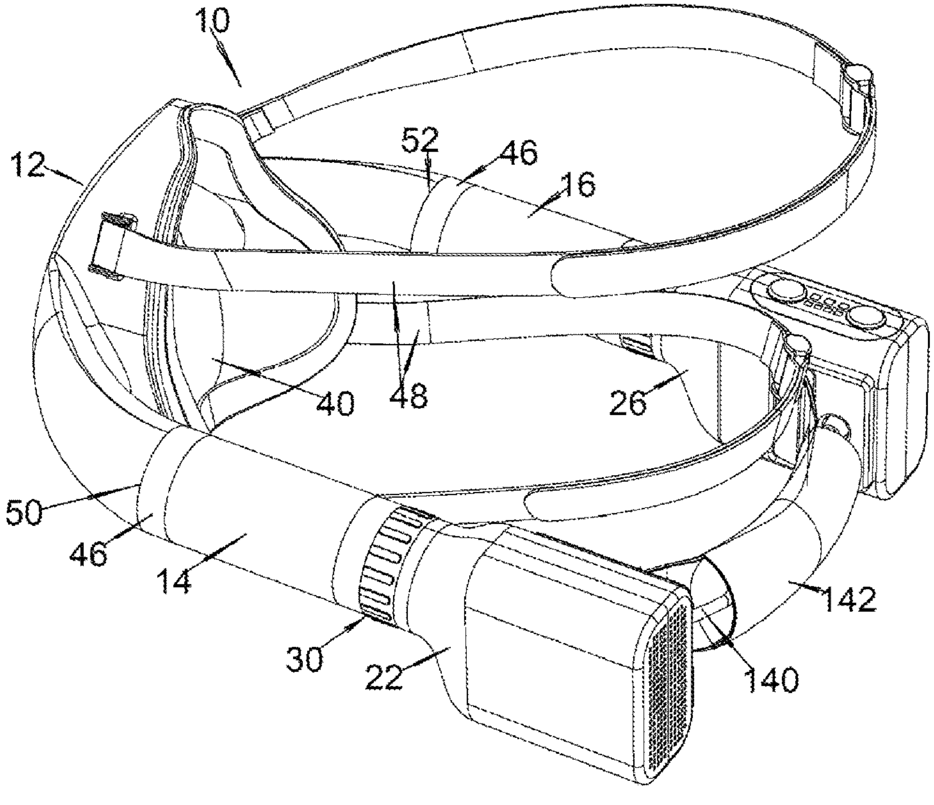
FIG. 4 shows another perspective view of a respirator of FIG. 1.
Figure 5:
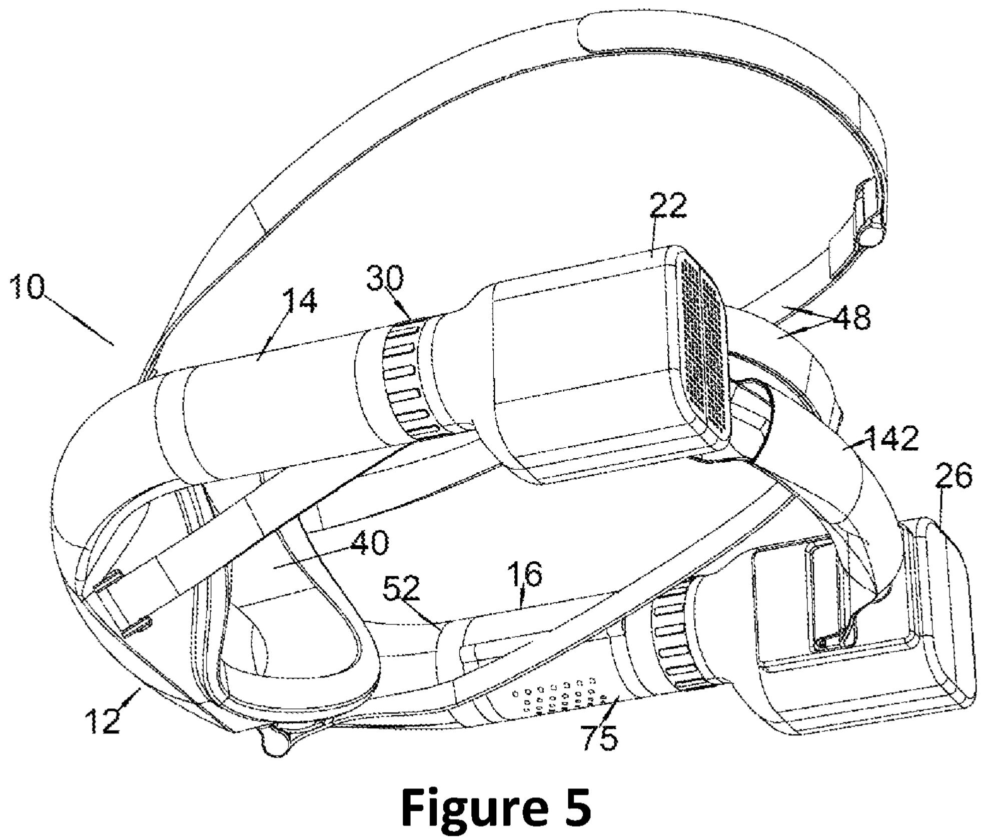
FIG. 5 shows another perspective view of a respirator of FIG. 1.
Figure 6:
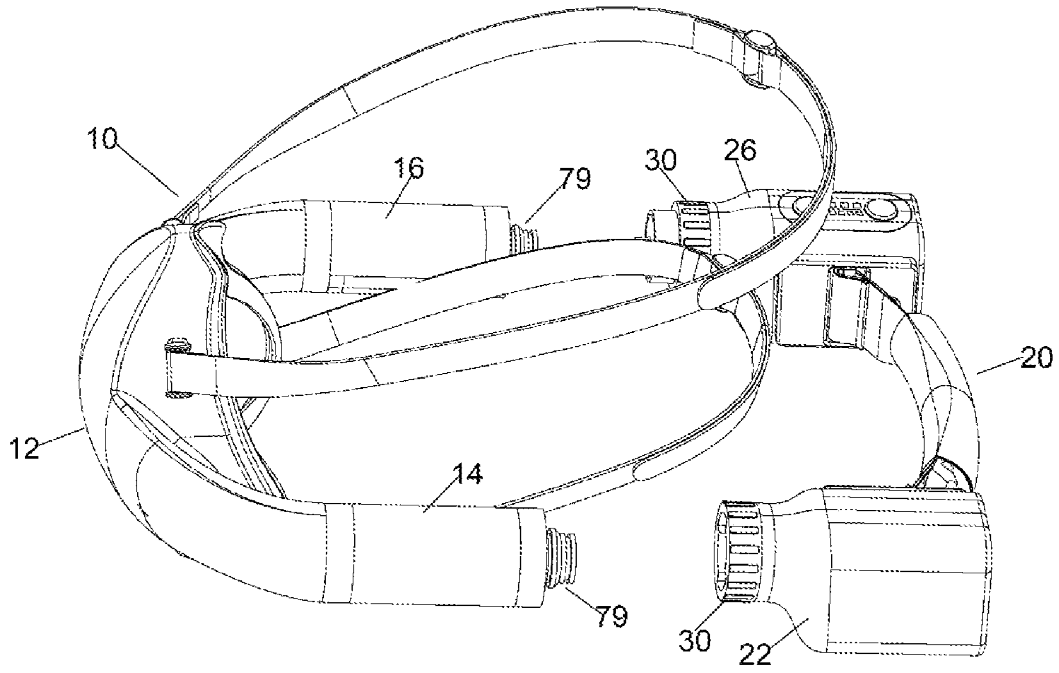
FIG. 6 shows an exploded perspective view of a respirator of FIG. 1.
Figure 7:
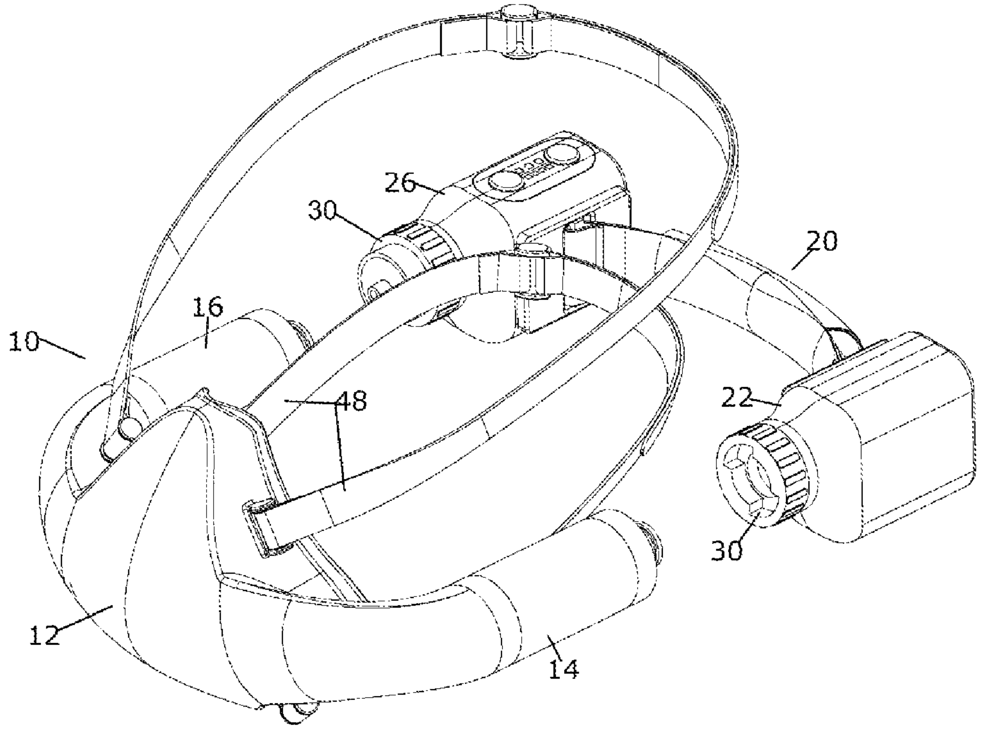
FIG. 7 shows another exploded perspective view of a respirator of FIG. 1.
Figure 8:
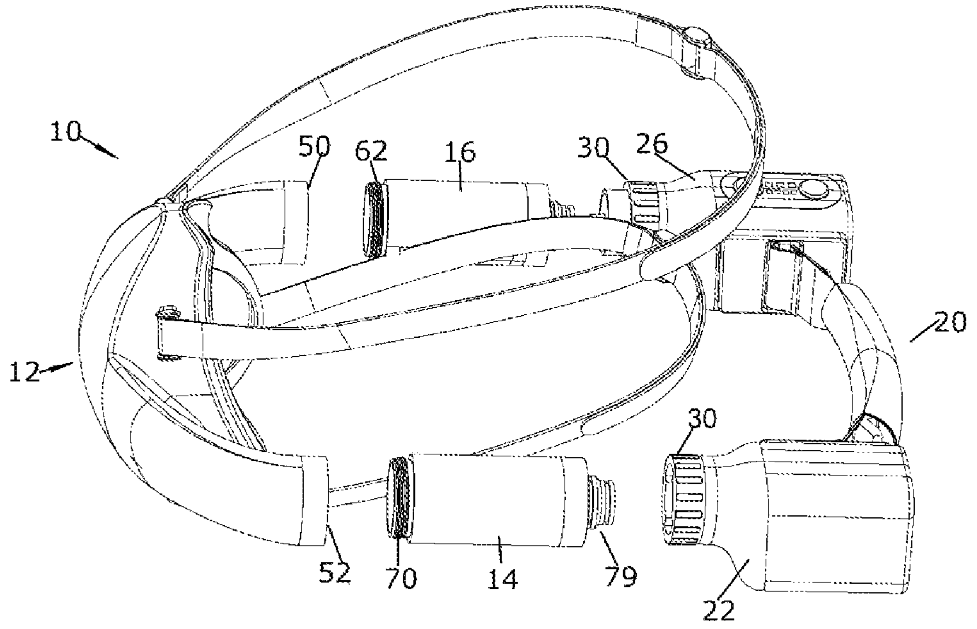
FIG. 8 shows another exploded perspective view of a respirator of FIG. 1.
Figure 9:
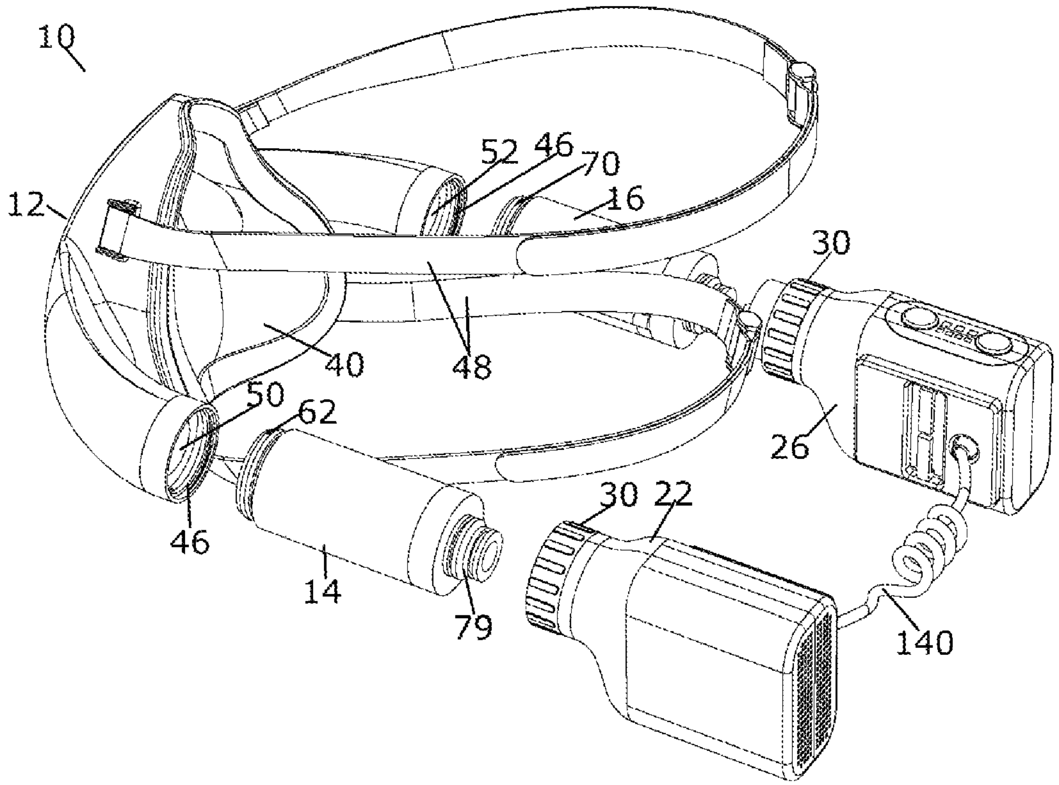
FIG. 9 shows another exploded perspective view of a respirator of FIG. 1.
Figure 10:
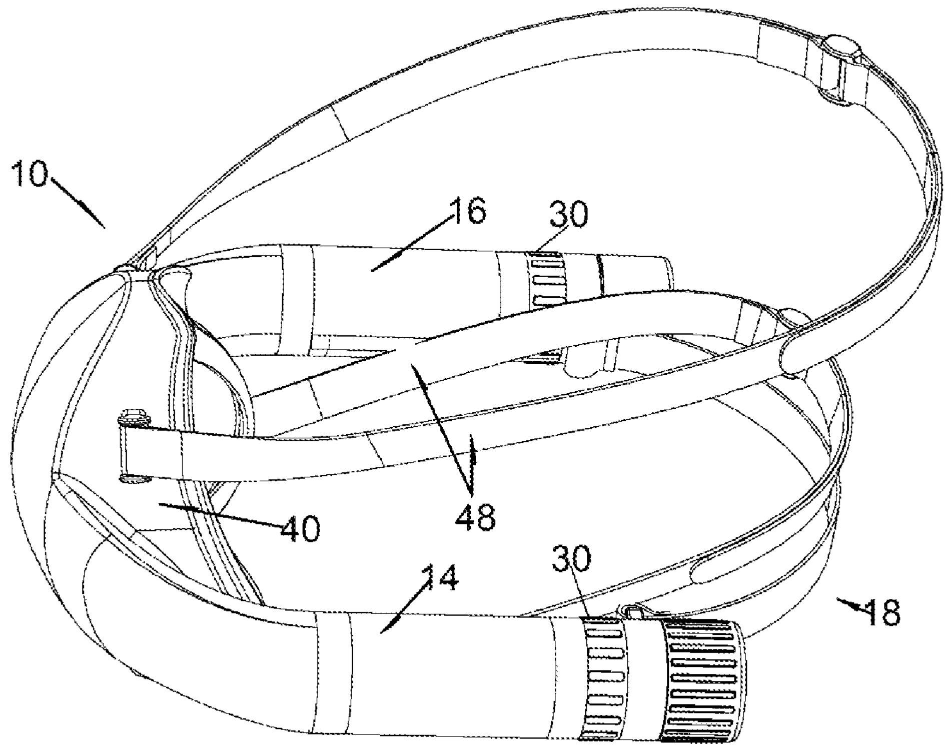
FIG. 10 shows a perspective view of a respirator in non-power version of another embodiment of the present invention.
Figure 11:
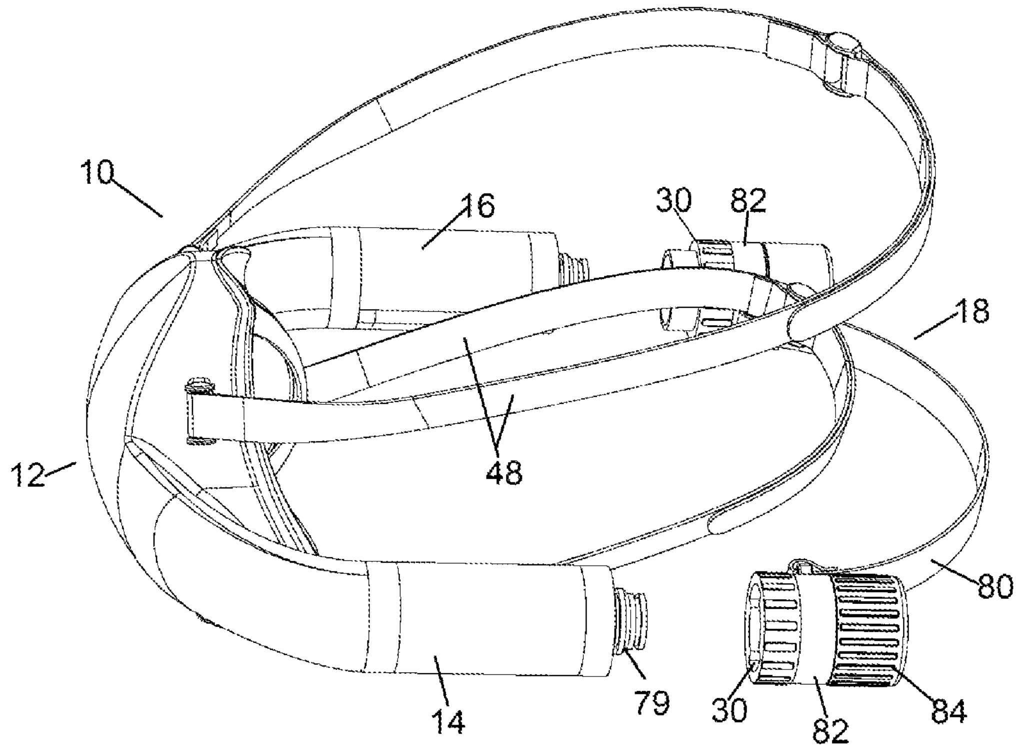
FIG. 11 shows an exploded perspective view of a respirator of FIG. 10.

Referring to FIGS. 1 to 29, in one embodiment of the present invention, there is provided a modular respirator 10 comprising an elongate filter unit 14 having a filter inlet 66, a filter outlet 67, and a replaceable fluid filter 65 for filtering pollutant in the fluid, such as air. The modular respirator 10 comprises an elongate exhaust unit 16 having an exhaust inlet 72, an exhaust outlet 71, and one or more one-way valves 73.

The modular respirator 10 further comprises a mask assembly 12 having a mask for covering the oral and nasal passage of a user, a mask inlet 50 at one end of the mask, a mask outlet 52 at an opposite end of the mask, wherein the mask inlet is releasably fastened to the filter outlet 67, and the mask outlet is releasably fastened to the exhaust inlet 72.

The filter unit 14 is located around an anterior triangle on one side of a neck and the exhaust unit 16 is located around or in the vicinity of an anterior triangle on an opposite side of the neck forming a tightly sealed passage for fluid to pass through the filter unit, the mask 12 and the exhaust unit.

As the shape of the filter unit 14 and the exhaust unit 16 are elongate shapes, both are adapted to wrap around at least partially around the neck in the vicinity of the anterior triangles. This is different to other dish shaped filter which are not adapted to wrap around the neck. The filter unit 14 and the exhaust unit 16 are similar in shape, size, and weight so that they are balance around both sides of the neck.

In one embodiment, the pipe thread connectors complies with ISO 7-1, 7-2, 228-1, and 228, or the national pipe thread standards.

The modular respirator 10 further comprising a blower unit 22 having a blower inlet 106, a blower outlet 107 and an electric blower for driving fluid from the blower inlet to the blower outlet; and a controlling unit 26 having a power unit 24 and a controller 27 for controlling the electric blower. The blower outlet 107 is releasably connected with the filter inlet 66 of the filter unit 14, and the controlling unit 26 is releasably connected to the exhaust unit 16.

Preferably, the blower unit 22 and the controlling unit 26 have elongate shapes. As the shape of the blower unit 22 and the controlling unit 26 are elongate shapes, both are adapted to wrap around at least partially around the neck in the vicinity of the sternomastoid muscles and the posterior triangles. The blower unit 22 and the controlling unit 26 are both similar in shape, size, and weight so that they are balance around both sides of the neck. The blower unit 22 and the controlling unit 26 connect to a neck band 142 around the back of the neck. In one embodiment, the blower unit 22 and the controlling unit 26 may rest their weight upon the shoulders of the user.

In one embodiment of the present invention, there is provide a modular respirator 10 for sport comprising a mask assembly 12 adapted to cover the nasal and oral passage of a user, a filter unit 14, an exhalation unit 16. In another embodiment, the modular respirator 10 further comprises an air flow generator 20 including a blower unit 22, a power unit 24, and a PCB (or controller) unit 27. The modules of the respiratory 10 is preferably connect with one or more connection assembly 30. Optionally, additional elastic neck bands and/or head bands (not shown) may be provide for further distribution of load.

The filter unit 14 and the exhalation unit 16 are connected with the mask 12 via the pipe thread connector, designed to make connect and disconnect easy. And it also makes the connection reliable and leak free.

In one embodiment where an air flow generator 20 is used, the filter unit 14 and the exhalation unit 16 are connected to the blower unit 22 and controlling unit 26 via one or more connection assembly 30 or push-fit connectors. The connection assembly 30 provides a locking mechanism, wherein the connector assembly can be engaged with other module by simply pushing the parts together, and released by manipulating a ring 77 on the connection assembly.

In another embodiment where no air flow generator 20 is installed, the filter unit 14 and the exhalation unit 16 are connected to a neck band assembly 18.

The embodiment without an air flow generator 20 can be easily convert to one with an air flow generator. This is achieved by simply removing the neck band assembly 18 that is connected to the connection assembly 30 and connecting the air flow generator 20.

Similarly, to change from a respiratory 10 with air flow generator 20 to one without an air flow generator, the user simply needs to remove the air flow generator 20 via the connection assembly 30, and replace it with a neck band assembly 18.

This modular structure allows one design to be configured to two separate products, which allows an easy upgrade from the non-powered respiratory to a powered respirator, or vice versa, from the powered respiratory to the non-powered respiratory for meeting some specific needs.

Mask Assembly

Referring to FIGS. 1 to 11, the mask assembly 12 consists a mask 40 with frame and a cushion that is in contact with the face to form an air tight seal covering nasal and oral passage of a person, and two pipe thread connectors 46 at the mask inlet 50 and mask outlet 52. The preferred material for the cushion is silicone rubber. Other rubber or TPE material can be used as well. The preferred frame material is Polycarbonate, and preferably it is transparent, or with colour pattern, but need to be able to see the mouth movement while talking.

Figure 31:
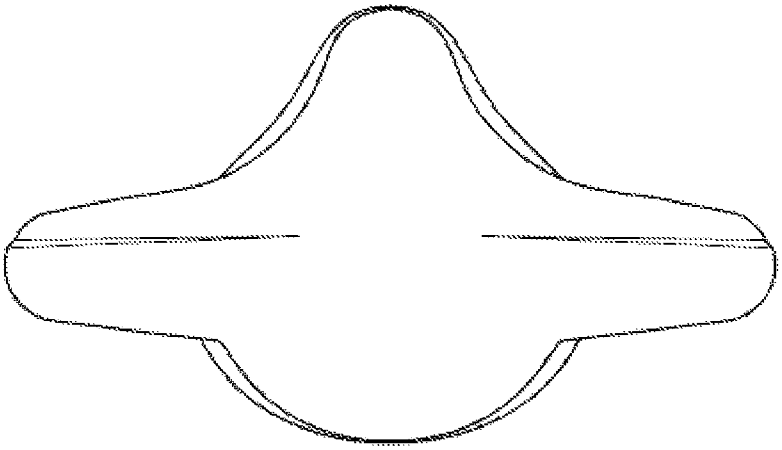
FIG. 31 shows a front view of a mask for used in the respirator of FIG. 1.
Figure 45:
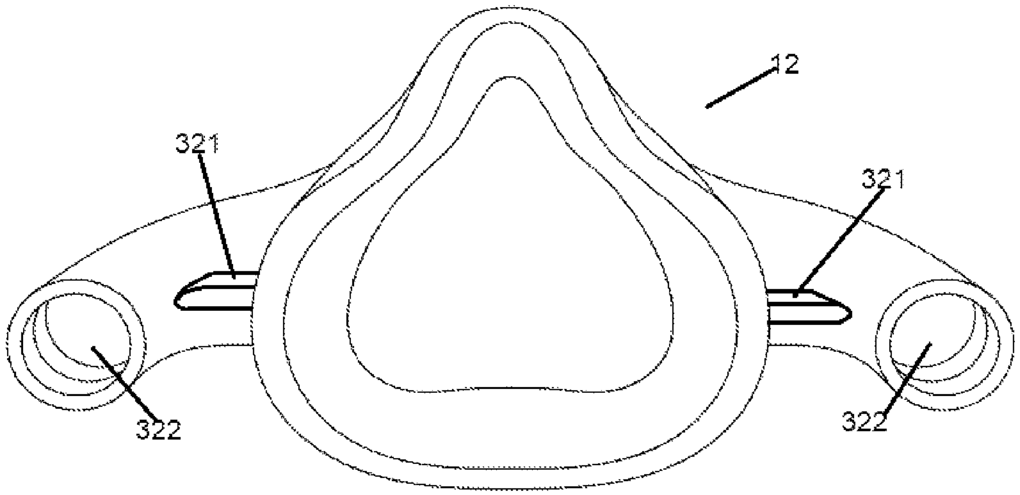
FIG. 45 shows a schematic back view of a mask used in the respirator of FIG. 36.
Figure 46:
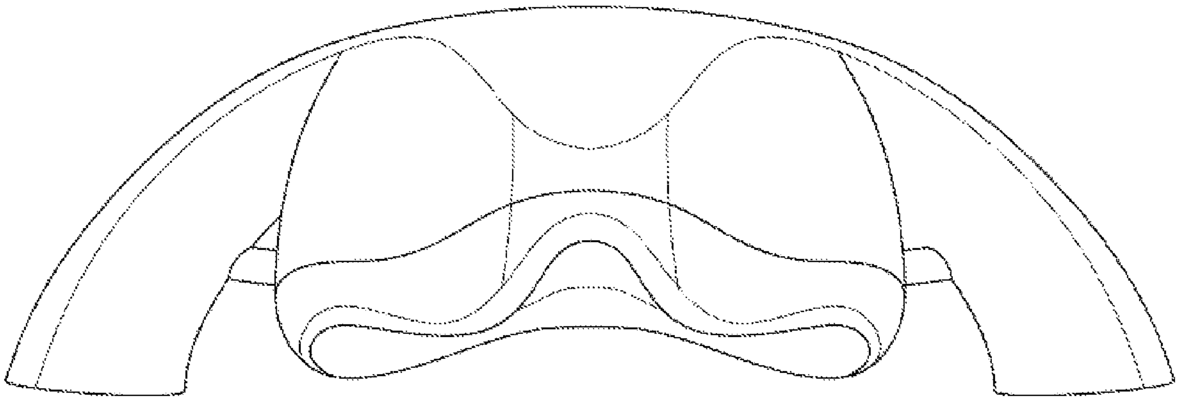
FIG. 46 shows a schematic top view of the mask of FIG. 45.
Figure 47:
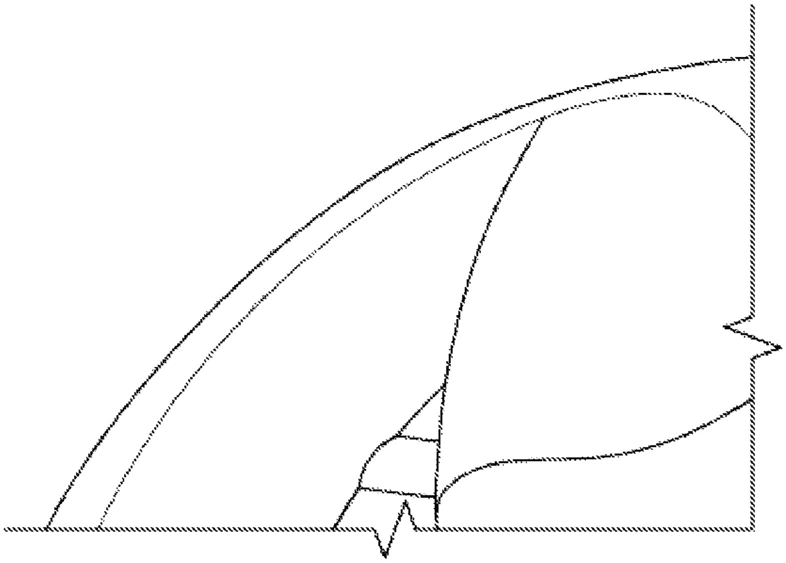
FIG. 47 shows a schematic view of a bridge structure of the mask of FIG. 45.

FIG. 31 shows a front view of a mask 40 in one preferred embodiment of the present invention. In another embodiment as shown in FIG. 45 and FIG. 46, a drain valve is added at the bottom of the mask 40 to allow accumulated condensation or sweat to drain away. The position of the valve makes minimum impact on the general appearance of the mask.

Figure 30:
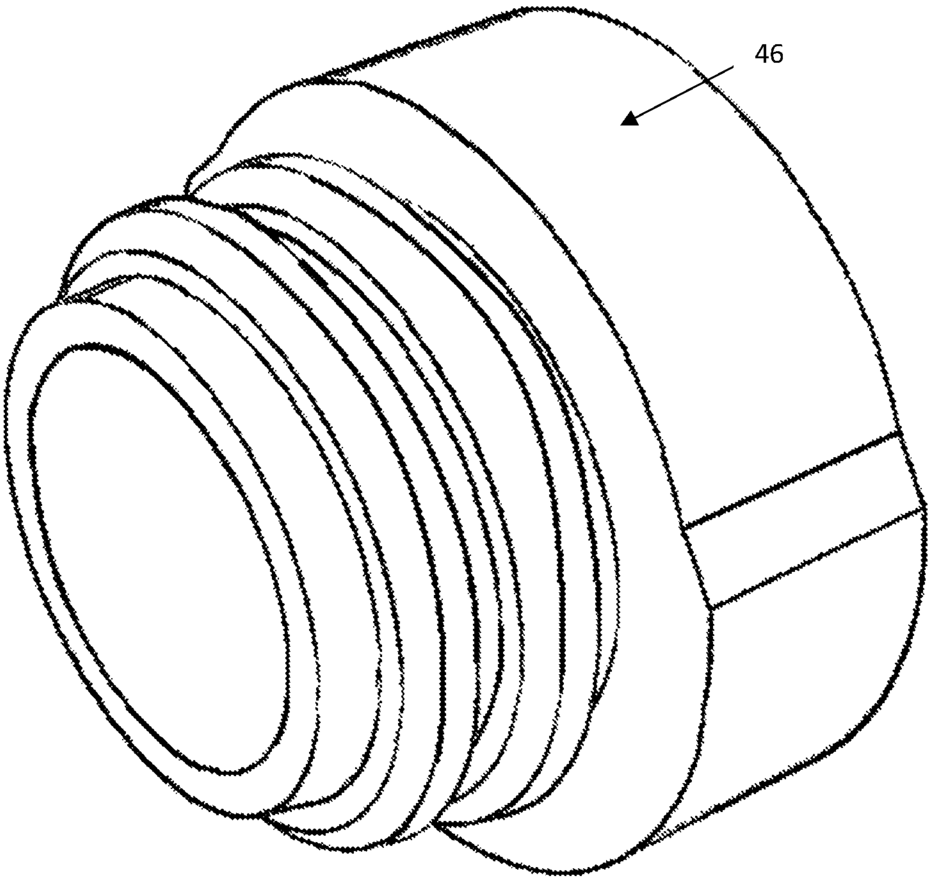
FIG. 30 shows a schematic view of a tread connector used in the respirator of FIG. 1.

FIG. 30 shows an embodiment of the tread connector 46 at the mask inlet 50. In another embodiment, an inhalation one-way valve is fitted to the end of the thread connector 46 to stop breathed air going back to the filter unit 14.

Preferably, the said mask assembly 12 is moulded or press-fit with the frame in polycarbonate, and the mask assembly is attached to the face by pull-over band/bands 48. The pull-over hands 48 can be a head band or neck band. The pull-over band 48 may be made of elastic material. In one embodiment, the material of the frame is made of silicone, so that the whole mask is moulded in silicone in one piece. Preferably, the cushion has an air inlet port/mask inlet 50 at one side to connect to the said filter unit 14, and an air outlet port/mask outlet 52 at the other side to connect to the said exhalation unit 16; both the filter unit 14 and the exhalation unit 16 are preferably connected to the corresponding port with a corresponding thread connector 46. In one embodiment, the cushion is made of silicone. The thread connector 46 of the mask inlet 50 is adapted to engage with a complementary thread connector of the filter outlet 67 of the filter unit 14. The thread connector 46 of the mask outlet 52 is adapted to engage with a complementary thread connector of the exhaust inlet 72 of the exhaust unit 16.

Preferably, the frame has one pair of hooks located towards the top of the said frame with one at each side of the frame, and another pair of hooks located towards the bottom of the frame with one at each side of the frame. The pull-over bands 48 tie to the said two pair of hooks and are preferably used in one of the two ways: A—one band is used for tightening at the upper back of the head, and the other band is used for tightening at the lower back of the head; B—one band is used for tightening at one of the ears, and the other band is used for tightening at the other ear.

In another embodiment, the two separately located said pair of hooks can be replaced with one pair of centre-hooks, where the said centre-hooks are located at around the centre line of the said frame with one at each side of the said frame.

Preferably, the said pull-over bands 48 tie to the said pair of centre-hooks and can be used in one of the two ways: A—one band is used for tightening at the upper back of the head, and the other band is used for tightening at the lower back of the head; B—one band is used for tightening at one of the ears, and the other band is used for tightening at the other ear.

Filter Unit

Figure 12:
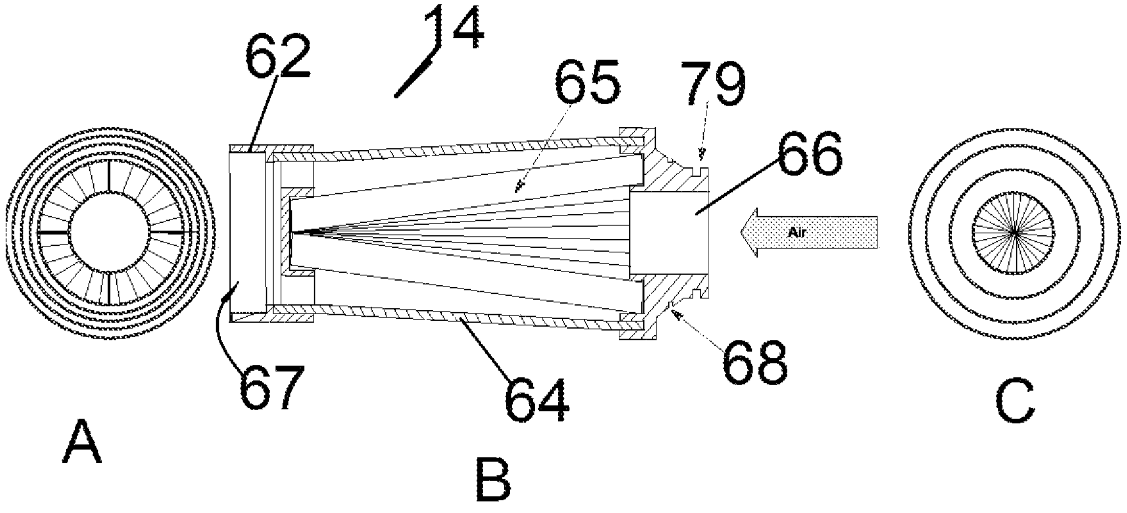
FIG. 12 shows a schematic view of a Filter Unit used in the respirator of FIG. 1 or FIG. 2.

Referring to FIG. 12, the filter unit 14 connects to the mask assembly 12 via a thread connector 62 at its filter outlet 67. An elastic spacer such as an O-ring or washer is fitted at the end of the thread to ensure that the seal is tight. The filter 14 unit comprises: a filter case 64, a filter 65, a filter inlet 66 and a filter outlet 67.

Preferably, the filter 65 is adapted to block the fine particles or pollutants in the air that are harmful to the wearer. The filter 65 may optionally have nuisance level harmful gas absorption capability, such as by impregnating activated carbon with the filter media of the filter. The filter case 64 of the filter 65 is preferably elongate in shape and in cylindrical or conical form and is tapered, and preferably larger at the end of the filter inlet 66 to allow a larger air inlet passage in order to reduce the flow resistance. The filter element of the said filter 65 is preferably tapered in cone shape in order to increase the air path of the cross section area of the filter at its outlet 67 to minimise flow resistance. The filter unit 14 has an inlet portion where an elastic spacer is fitted to groove to form an air-tight seal with the connection assembly 30 or push-fit connectors.

In one embodiment, the filter unit 14 has an inlet portion where an elastic spacer is fitted to form an air-tight seal with one of the male and female push-fit connectors. When the filter unit 14 comprises a male push-fit connector, it is adapted to engage with a complimentary push-fit connector that is a female push-fit connector. When the filter unit 14 comprises a female push-fit connector, it is adapted to engage with a complimentary push-fit connector that is a male push-fit connector. In one embodiment the inlet portion also has a spring locking groove to work with the connection assembly 30.

The filter unit 14 is removable from the respirator 10 for replacement. In one embodiment, the filter unit 14 comprises a serviceable case adapted to provide access for replacing the fluid filter. The interior of the filter unit 14 is accessible for cleaning and replacement of the filter 65. Other type of filter such as flat filter or cylindrical filter can be used instead of the conical shaped filter. In one embodiment, the filter unit 14 provides a slot for receiving a removable air filter for easy replacement. In one embodiment, the filter 65 is a high-efficiency particulate absorber air filter or ultra-low penetration air filter. Depending on the type of air filter, an air flow generator 20 may be required to assist the air flow.

Exhalation Unit

Figure 13:
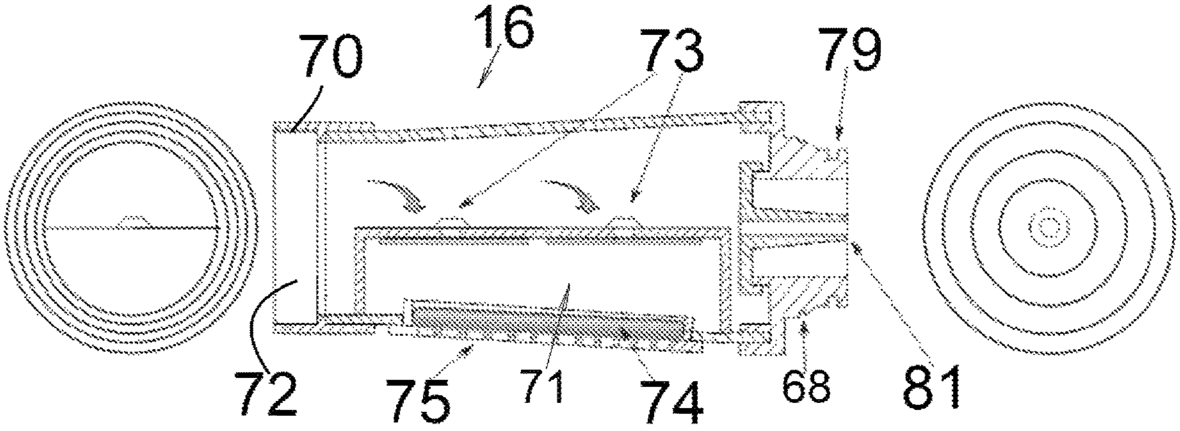
FIG. 13 shows a schematic view of a Exhalation Unit using in the respirator of FIG. 1 or FIG. 10.
Figure 14:
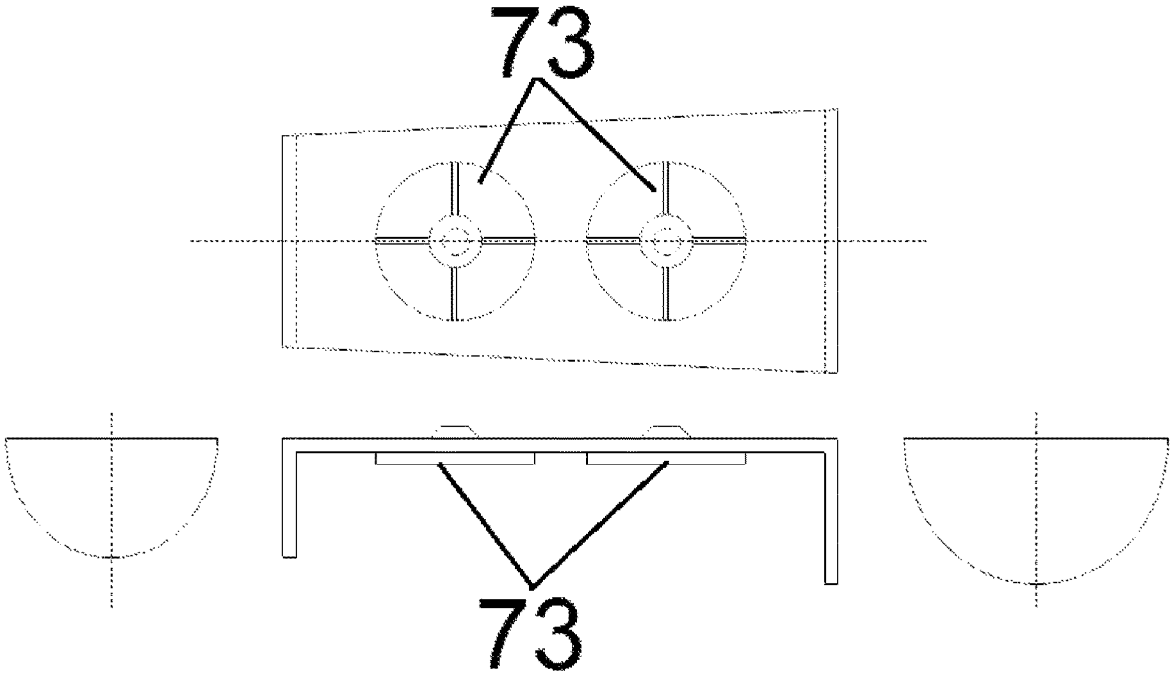
FIG. 14 shows a schematic view of a valve mounting plate of the Exhalation Unit of FIG. 13.

Referring to FIGS. 13 and 14, the Exhalation Unit 16 is adapted to connect to the mask assembly 12 via the pipe thread 70 at the end of the inlet 72. An elastic spacer such as an O-ring or washer is fitted at the end of the thread 70 to provide a tight sealing.

The exhalation unit 16 is adapted to convey exhaled air from the mask assembly 12 to the environment outside the respirator 10. The exhalation unit 14 comprises at least one exhalation valve 73, an optional exhaled air filter 74 and a cover 75 to conceal the exhalation valve 73 and the exhaled air filter 74. Typically, the exhalation valve 73 is a one way valve such that air may flow from the mask assembly 12 to the exhaled pathway but not vice versa.

The exhaust unit 14 has a mounting plate for supporting the one-way valves. In one preferred embodiment, there is provided a dial on a filter cover or the mesh cover 75 to adjust the air resistance of the exhaust outlet 71. So the modular respirator 10 could have both inlet and outlet resistance adjustment options.

The exhalation unit 16 may have access to an air pressure sensor sensing an air connection portion and communicating with the controlling unit 26. In one preferred embodiment, pressure sensor is positioned in the controlling unit 26. A small air passage 81 is constructed to allow the air pressure sensor to sense the air pressure of the mask 12. An O-ring is fitted on the air connection portion to form an air-tight seal with the connection assembly 30. The inlet portion also has a spring locking groove 68 to work with the connection assembly 30.

In another embodiment of the present invention, modular respirator 10 comprises one or more sensing devices, wherein the sensing devices have a self-sustained controller and power supply. In one embodiment, the sensing device is a $CO_2$ measurement device, as $CO_2$ is one of the important parameters to determine if the user is over-breathing or not.

Figure 15:
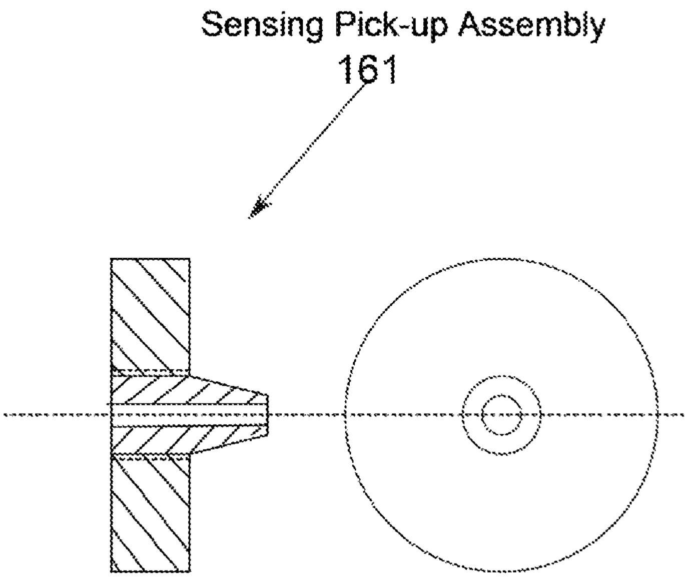
FIG. 15 shows a sensing pick-up assembly using in the respirator of FIG. 1 or FIG. 10.

In one embodiment, air samples are picked up via the sensing pick-up assembly 161 as shown in FIG. 15, where the sensing pick-up assembly is press-fitted in the connection assembly 30. For examples, the said sensing pick-up assembly 161 is fitted in the connection assembly 30 that connects to the controlling unit 26, where a sensor tubing is used to connect between a pressure sensor and the pick-up port in the sensing pick-up assembly 161. The sensing pick-up assembly 161 can have more than one ports separated apart, and one of them can be used to pump out a small stream of air via a small pump located in the controlling unit 26 before feeding the sampled air to a $CO_2$ sensor.

Connection Assembly/Push-Fit Connectors

Figure 16:
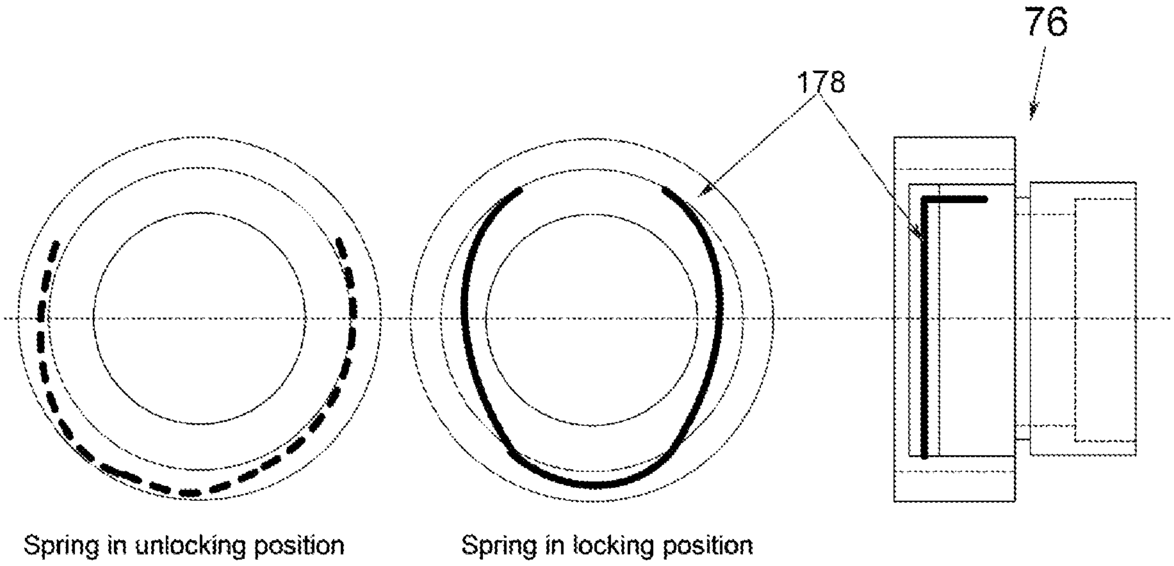
FIG. 16 shows a schematic view of the quick connect interface of a connection assembly using in the respirator of FIG. 1 or FIG. 10.
Figure 17:
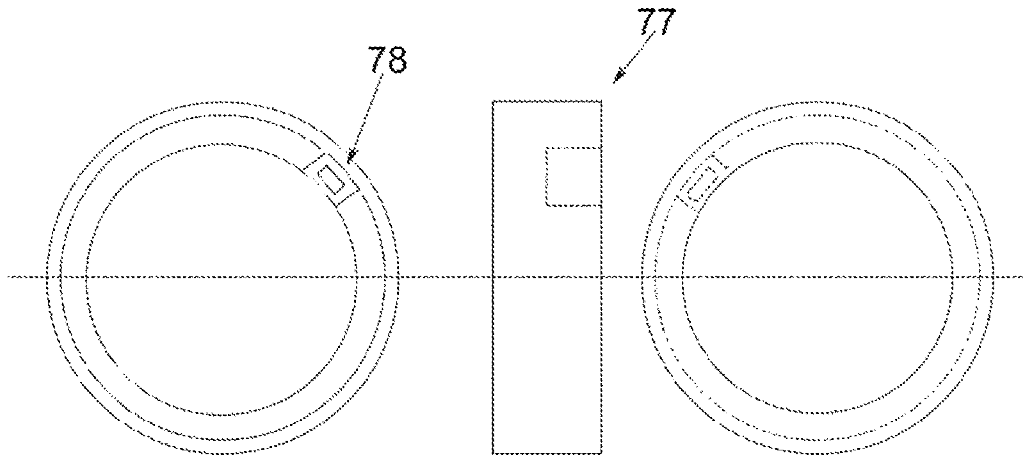
FIG. 17 shows schematic view of the quick connect ring of the connector assembly using in the respirator of FIG. 1 or FIG. 10.

Referring to FIGS. 16 and 17, the connection assembly 30 or push-fit connector consists of a socket 76 and a ring 77. In one embodiment, the connection assembly 30 comprise a Quick Connect Interface and a Quick Connect Ring.

In one embodiment, the socket 76 has a spring loaded releasing bush that engages with the ring 77. In the normal connected position, the spring 178 pushes to fall into the locking groove 68 on a stud connector 79 on the filter 14 or exhalation units 16. Typically, the male push-fit connector comprises a stud connector 79 with a locking groove 68. The female push-fit connector comprises a socket 76 have a spring 178 for engaging the locking groove 68, and a ring 77 with one or more latches 78 to form spring loaded latches for manipulating the spring 178 and the locking groove 68.

Air Flow Generator

Figure 18:
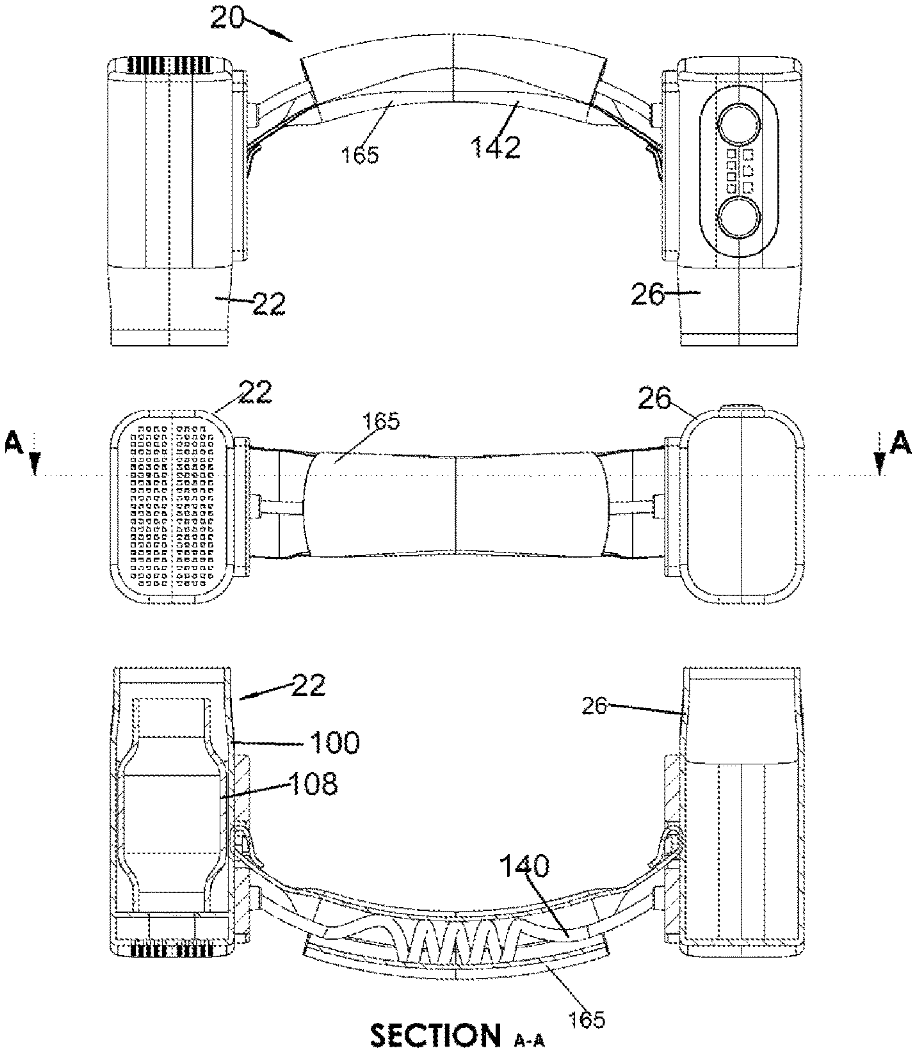
FIG. 18 shows a series of schematic plain views of a neck band assembly used in the respirator of FIG. 1.
Figure 19:
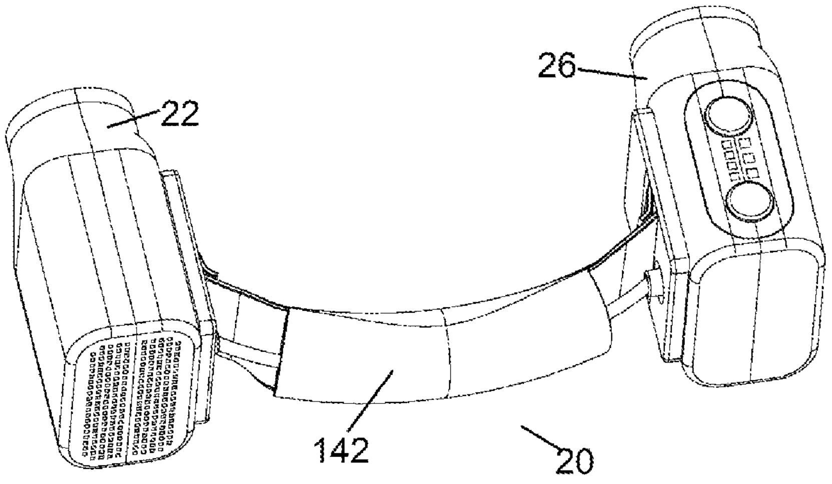
FIG. 19 shows a perspective view of the neck band assembly of FIG. 18.
Figure 20:
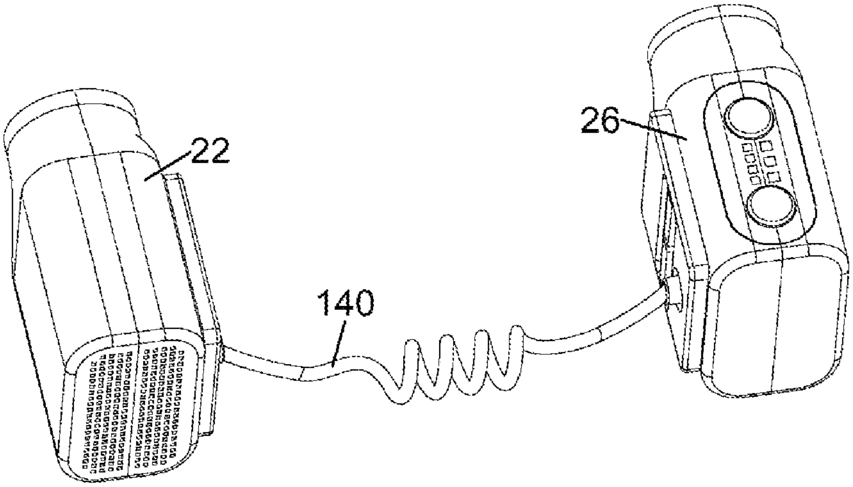
FIG. 20 shows another perspective view of the neck band assembly of FIG. 18.

Referring to FIGS. 18 to 20, the air flow generator 20 comprises of a blower unit 22, a controlling unit 26 holding the electronics and the power unit 24, and an adjustable neck band 142. Optionally, there is also provided a head band. In one preferred embodiment of the present invention, there are electronics for sensing/analytical purpose, such as flow, pressure and $CO_2$. If flow sensor to fit with the blower unit 22, the electrical cable runs from right side to left side as in the powered version.

Figure 23:
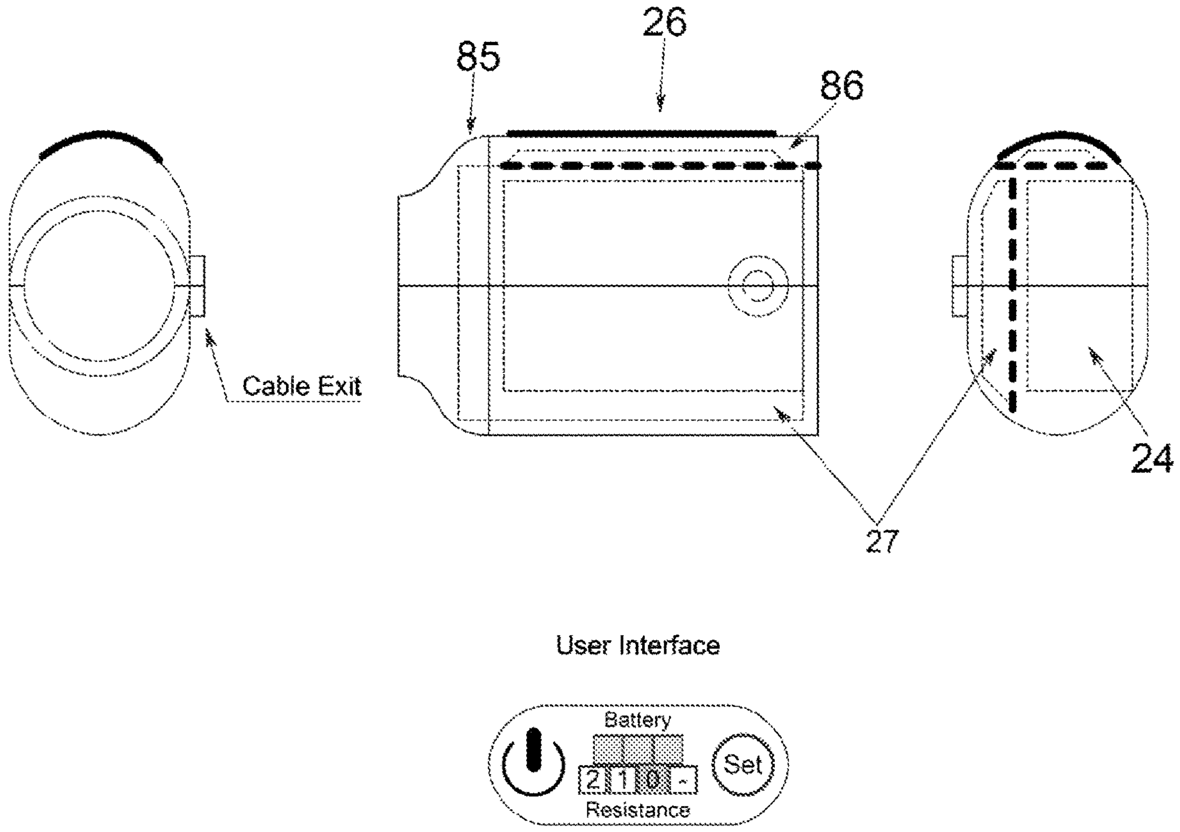
FIG. 23 shows a schematic view of a power unit and electronic circuit unit of the respirator of FIG. 1.
Figure 24:
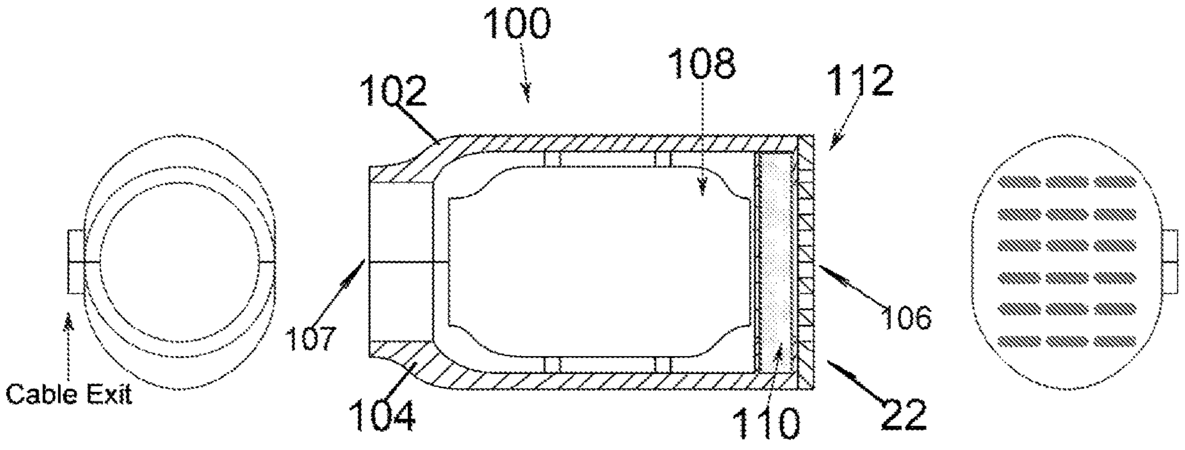
FIG. 24 shows a schematic view of a blower unit of the respirator of FIG. 1.

The controlling unit 26 as shown in FIG. 23 comprises a casing 85 housing the printed circuit board, the electronic components and batteries. The casing 85 in turn consists of a first shell portion and a second shell portion that is connected together by releasable joining means such as snap-fit joint, or screw joint. The casing 85 of the controlling unit 26 is adapted to accommodate a power unit 24, a controller, a sensor system and a Keypad/LED controlling system. In one preferred embodiment, the power unit 24 comprises a rechargeable battery pack, and there is another circuit for charging control.

The small end connects to one of the male and female push-fit connectors of the connection assembly 30 via the pipe thread connection.

The controller controls the blower unit 22 to deliver the required air pressure and flow to the mask assembly 12, and the power unit 24 is used as an energy storage means to provide the electrical power to the power assembly. A breath responsive flow control algorithm is made to control the air flow to the mask assembly 12. The breathing resistance is controlled by the peak pressure in the mask assembly 12. When the peak pressure is negative, breathing resistance is present. For producing higher resistance, the blower will need to product less flow. The breathing resistance is set in multiple levels, where the higher value in level represents higher resistance. For example, setting "0" simulates normal breathing. Setting "-" provides a boosted flow trying to maintain positive pressure in the mask assembly 12, thus providing a setting for the best air pollution protection among all other settings.

The controller also performs battery charging and battery state of charge indication. Preferably, charging voltage can be in a range of 5V to 15V, with slower charging time at 5V and faster charging time from 13.5V to 15V. In another embodiment, the charging current can linearly be increased with the increase of the input voltage. Preferably, charging voltage can be in a range of 5V to 12V, with slower charging time at 5V and faster charging time at 12V increasing linearly with the voltage.

In another embodiment, the controlling unit 26 further comprises a communication means for sending data such as breathing data to a data analytical device such as a smartphone or a smart wristband. The data is logged and can be displayed via the analytical device. The analytical device typically has more processing power and may receive data from other sources, such as the global positioning system, thermometer, barometer, hygrometer, etc. The analytical device may send signal to control the modular respirator 10.

Since data and control signal may be communicated between the modular respirator 10, a number of secured measure will be implemented to ensure the integrity of the data. In one embodiment, the controlling unit 26 comprises a cryptographic circuit to maintain a secured channel for communicating data.

In one preferred embodiment, at least one pressure sensor is mounted on the sensor system, which is used to sense the mask pressure via the said air passage in the exhalation unit. In another embodiment, a flow sensor can be used to measure flow and tidal volume.

The Keypad/LED controller controls the keypad/LED 86 disposed on the surface of the casing 85. The keypad/LEDs can serve as user interfaces.

In one embodiment, there is no blower unit 22 provided in the modular respirator 10. However, the modular respirator 10 comprises a controlling unit for receiving and analysing data from different sensing device on the modular respirator. In this setting, the modular respirator 10 may provide a more sophisticated display unit in place of the blower unit 22 for displaying the information graphically. The electric cables for the sensing devices and the display may be embedded in the neck band assembly 18.

Neck Band Assembly

Figure 21:
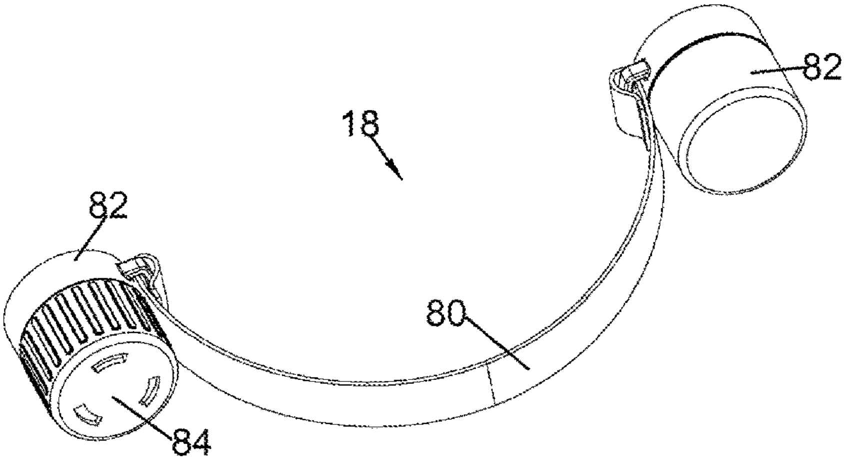
FIG. 21 shows a perspective view of a neck band assembly of used in the respirator of FIG. 10.
Figure 22:
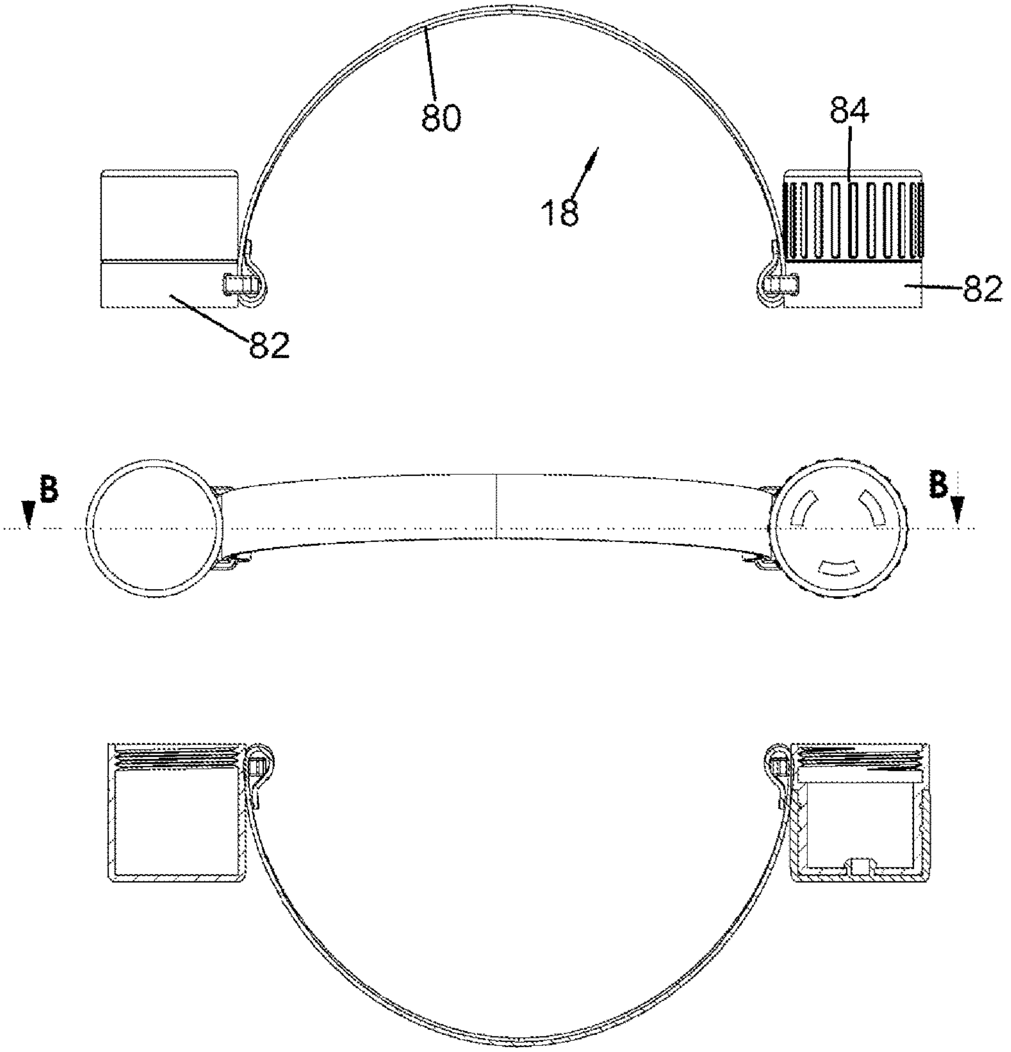
FIG. 22 shows a series of schematic plain view of a neck band assembly of FIG. 21.

Referring FIGS. 21 to 22, the neck band assembly 18 also has one of the male push-fit connector and female push-fit connector of the connection assembly 30 adapted to connect the filter unit 14 or the exhalation unit 16 together while forming an air-tight seal in between. In this position, the spring loaded latches 178 will be locked in the locking groove 68 accordingly. When the connection ring 77 rotates or pushes, the spring loaded latches 178 comes out of the locking groove 68, thus quickly disconnects from the filter unit 14 or exhalation units 16. The connection assembly 30 is attached to the air flow generator 20 or neck band assembly 18 preferably by pipe thread connection.

The neck band assembly 18 consists of neck band 80 having a stub or mating unit 82 at each extremity of the neck band assembly 18. The neck band assemble 18 also comprises an adjusting means 84 for adjusting the inhalation resistance. In one embodiment, the adjusting means 84 is a dial provided on a mating unit or stub 82 connected to the filter unit 14.

In one preferred embodiment, the mating unit/stub 82 comprises of pipe thread connection to engage with the pipe thread on one of the male and female push-fit connectors or socket 76.

When the neck band assembly 18 is in use as part of the system, the modular respirator 10 is operated in non-powered mode. The modular respirator 10 may provide a multi-level breathing resistance settings, and it also provides a smaller, lighter version of APRs.

In one embodiment, the adjusting means 84 is a dial. When the dial is in its most opened position, the inhalation resistance is the minimum. In one preferred embodiment, there are six step settings, with each step change about 25 $mm^2$ in cross-section area, and the minimum opening is around 25 $mm^2$. The dial has an arris at each step to provide a feel of the step and also to help hold the said dial position. The neck band 80 is adjustable in length. When the neck band 80 has been adjusted to a desired position, it remains in tightened position without becoming loose.

In another embodiment, the neck band 142, comprises a sleeve 165. The sleeve 165 of the neck band 142 is adapted to having one or more coiled cables to fit therethrough. The sleeve 165 which is also elastic. In another embodiment, the neck band 80 or head band is made of elastic material, Blower Unit Referring to FIG. 24-28, the blower unit 22 comprises a blower casing 100 housing an electric blower 108. The blower casing 100 comprising a top shell 102 and a bottom shell 104 releasably joined together by one or more releasably joining means such as snap-fit joint, or screw joint.

The blower casing 100 is adapted to accommodate a pre-filter 110. A filter cover 112 is provided on the blower casing 100 to cover the pre-filter 110. The pre-filter 110 is to protect the blower 108 from dust and dirt in the environment. Preferably, the pre-filter 110 efficiency is over 80% for particular size of over 0.3 μm. The pre-filter 110 may optionally have nuisance level harmful gas absorption capability, such as by impregnating activated carbon with the filter media of the pre-filter.

Inside the blower unit 22, there is provided an electric blower 108 comprising a motor 122 and an impeller 124. In one embodiment, the motor 122 and an impeller 124 are encased in a protective casing comprises a front shell 126 and a rear shell 128. In one embodiment, the motor 122 and impeller 124 will be assembled together, then the subassembly will be inserted into front shell 126. Finally, the rear case 128 will be put on.

In one embodiment, the motor 122 is a brushless direct current (BLDC) motor. Preferably, the BLDC motor is sensorless. The stator 131 of the motor is in a cylindrical shape wound with a number of coils, e.g. six. In order to facilitate the winding process, a number of protruding ribs 133 are provided on the stator 131. In one embodiment, there are six protruding ribs 133 disposed on the stator 131. As opposed to the way from the prior art, where the ribs are located along both ends and inner wall of the core, this design has the ribs located along both ends and outer surface of the core. The current design will relieve precious space of the inner wall area, thus leaving more room for the winding. This is advantageous for a smaller core, where the width of the ribs can occupy one to two turns of winding space per layer.

On the outer surface of the motor 122, there is provided a number of vane 130 to direct the air flow around the motor. The vanes 130 are also adapted to support the motor 122 inside housing of the electric blower 108 such that the motor will securely fitted inside the blower casing. On one of the shells of the housing of the electric blower 108, there is provided an opening adapted to allow the wiring pass therethrough.

In one embodiment, the impeller 124 comprises a conical stem 132 have a plurality of impeller fans 134 extending outwardly from the conical stem 132. The impeller 124 hence is also substantially conical.

In operation, the impeller 124 create a centrifugal motion pushing the air outwards to the wall of the front shell 126. The front shell 126 confines the flow of the air towards the motor 122 and the rear shell 128. The air flow leaving the impeller with a whirlwind motion. When the whirlwind gas moves towards the vanes 130 of the motor 122. In one embodiment, the vanes 130 is inclined in an opposite direction of the impeller fans 134 such that the vanes 130 correct the whirlwind motion to a straight motion directed to the rear shell 128. The rear shell 128 comprises a plurality of apertures for the gas to escape.

In one embodiment, the impeller is so designed that the airflow direction can be reversed according to the rotation direction, i.e. to draw air from the blower inlet in normal mode and to drawing air from the mask in reversed mode. Thus, when the impeller rotates to draw air from the mask, the wearer needs to breathe harder to overcome the reversed airflow from the blower, creating a breathing resistance to the wearer. By varying the reversed airflow, variable breathing resistance can be achieved.

The speed range of the blower can vary widely. During exhalation phase, the speed can be very low, down to 3,000 rpm. In the inhalation phase, the speed can go up to 50,000 rpm or even more. Higher top speed tends to make the blower smaller. However, when the speed is too high, it stresses the bearings, and may generate more noise. In one embodiment, the operation speed of the blower will be between 3,000 to 50,000 rpm.

Figure 25:
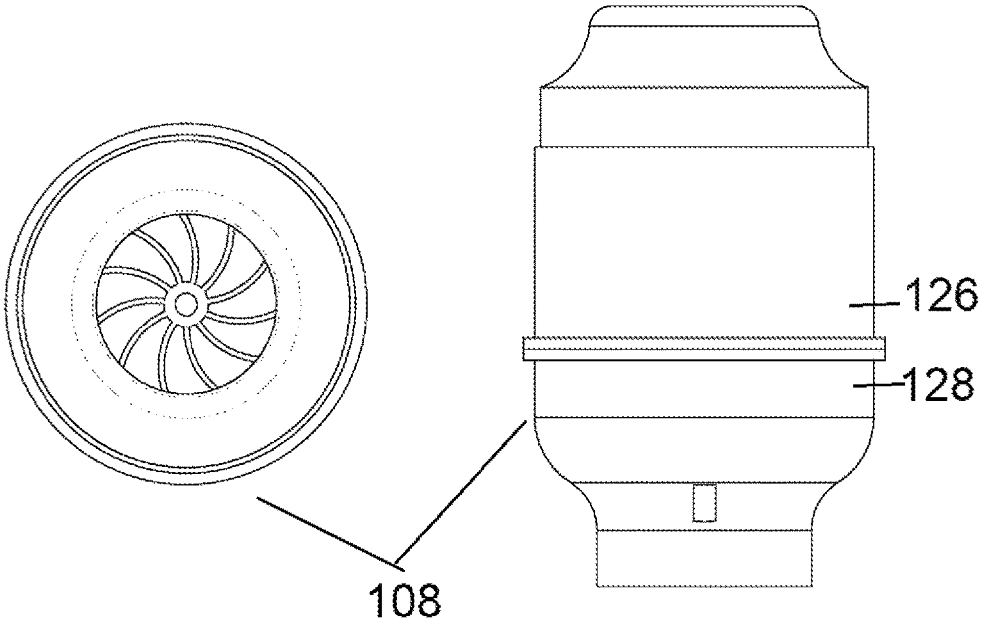
FIG. 25 shows a top plain view and front plain view of an electric blower of the respirator of FIG. 1.
Figure 26:
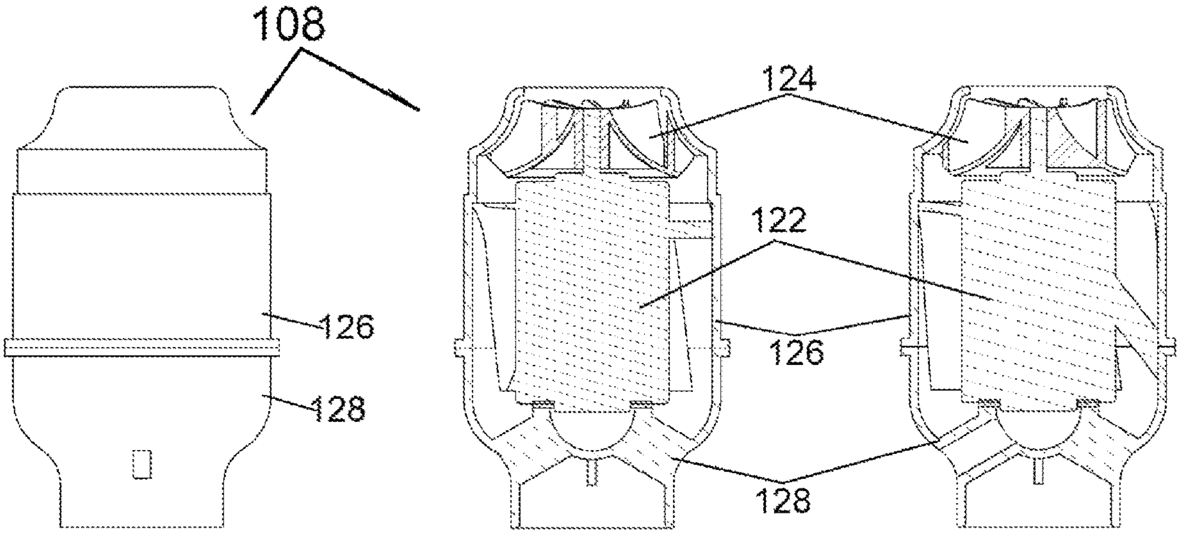
FIG. 26 shows a series of schematic plain view of an electric blower of FIG. 24.
Figure 27:
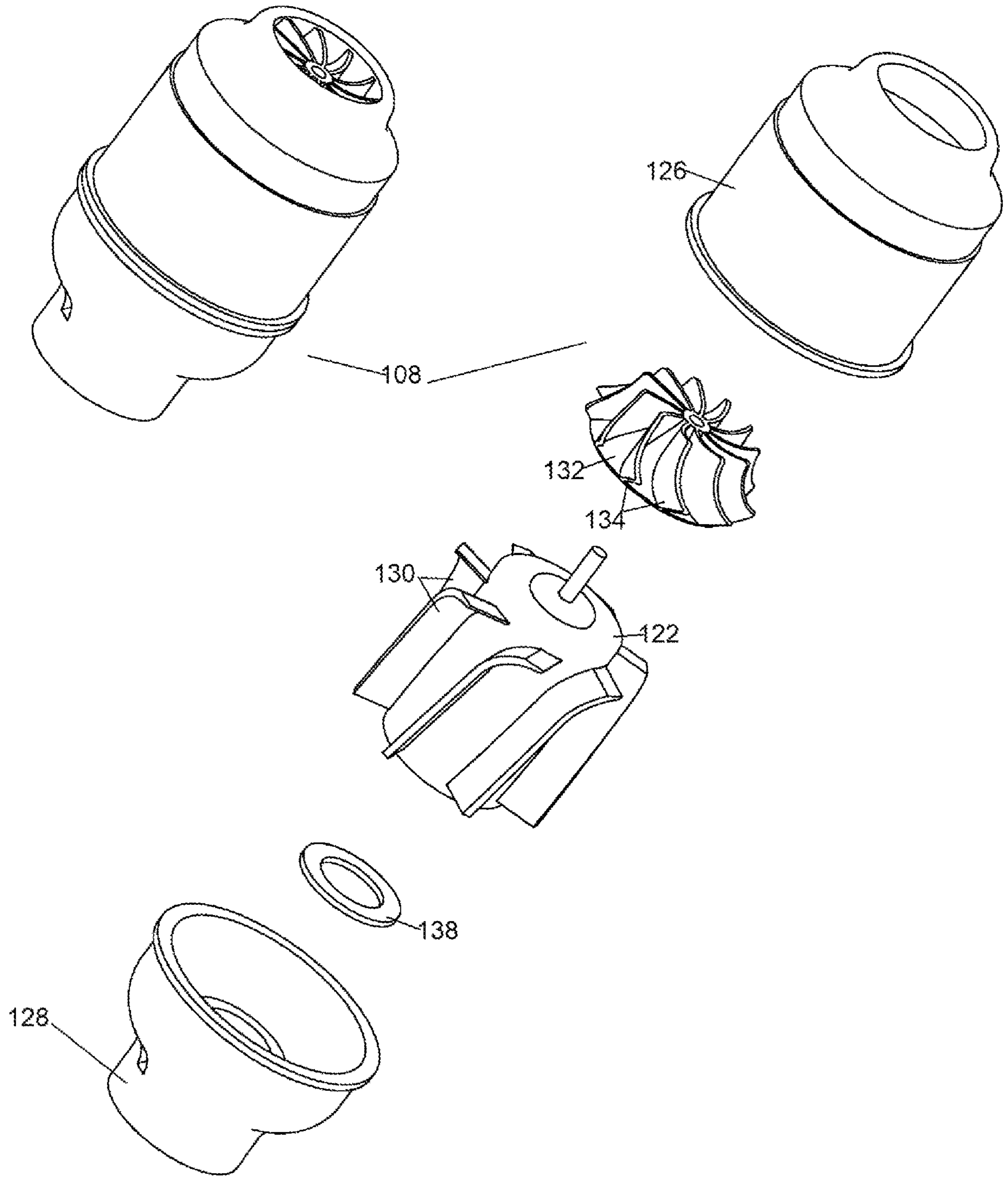
FIG. 27 shows a perspective view and an exploded perspective view of an electric blower of FIG. 24
Figure 28:
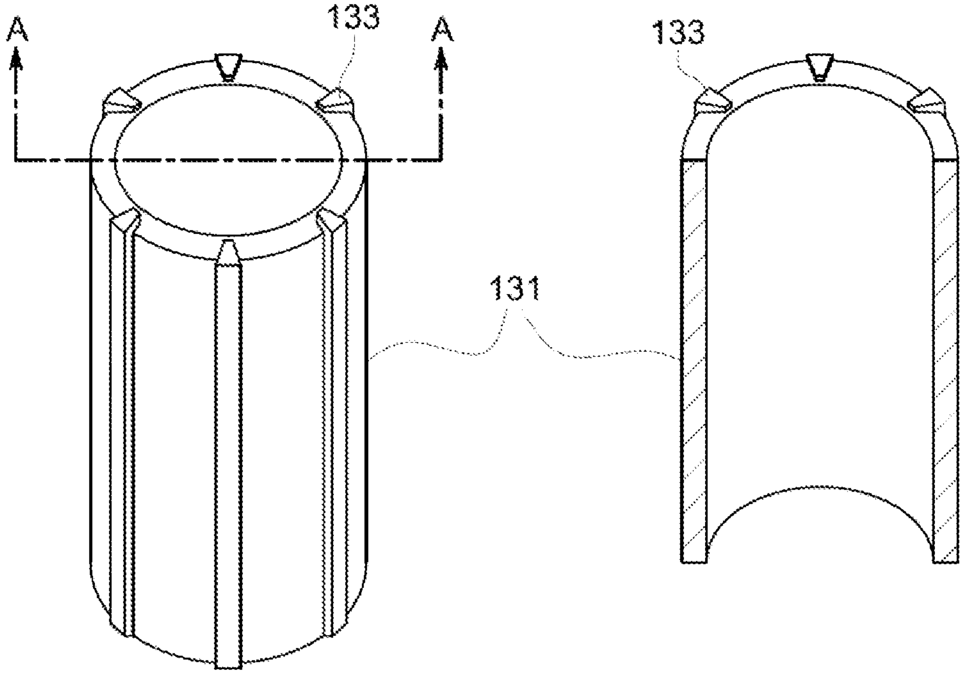
FIG. 28 shows a schematic view of a stator core used in an electric blower of FIG. 24.

The contour of casing of the electric blower 108 as shown in FIGS. 25-27 makes the flow more laminar or less turbulent. Further, the shape and arrangement of the impeller fans of the present invention can reduce the fan torque at a given fan speed for a range of fan pressure and flow product. As a result, the whole airpath of the respirator 10 (between blower outlet 107 to mask inlet 50, between air inlet to fan) is short, thus by design it lowers pressure loss, leading to energy saving, less motor speed for a given flow thus quieter.

In another embodiment, the stator 131 of the motor 122 is a ferrite core, which produces very low iron loss (eddy current) and hysteresis loss compared with silicon steel lamination. The elongated design also promotes low inertia that reduces the power demand at each inhalation motor acceleration phase.

In one embodiment, the rotor of the motor 122 will be accurately balanced in production. Further, a smaller rotor will be used to reduce the amount of imbalance. There is potting on the motor core windings, to reduce the windings vibration.

In another embodiment, the inlet filters or spaces in inlet compartment can be used to insert a silencer or noise damping material to reduce noise level.

In one embodiment, the blower average power is kept in a low level most of the time, as exhalation requires minimum power. Therefore the heat produced can be sufficient dissipated over the entire motor mass. The elongate shape of the motor 122, and the air flows just outside the wingdings separate by a thin wall. So it will help to take the heat way further.

The double casing of the motor 122 and the impeller 124 block out significant amount of operational noise created by the gas motion. In one embodiment, there is provided rubber cushion/suspension between the blower and blower housing. For example, the front shell 126 and rear shell 128 has silicone seal or pad 138 around the motor 122 to reduce operational vibration.

At one end of the blower unit 22, there is provided pipe threads for sealing connect to a connection assembly 30. On the other end of the blower unit 22 there is provided an adjustable neck band 142, and optionally a head band.

Figure 29:
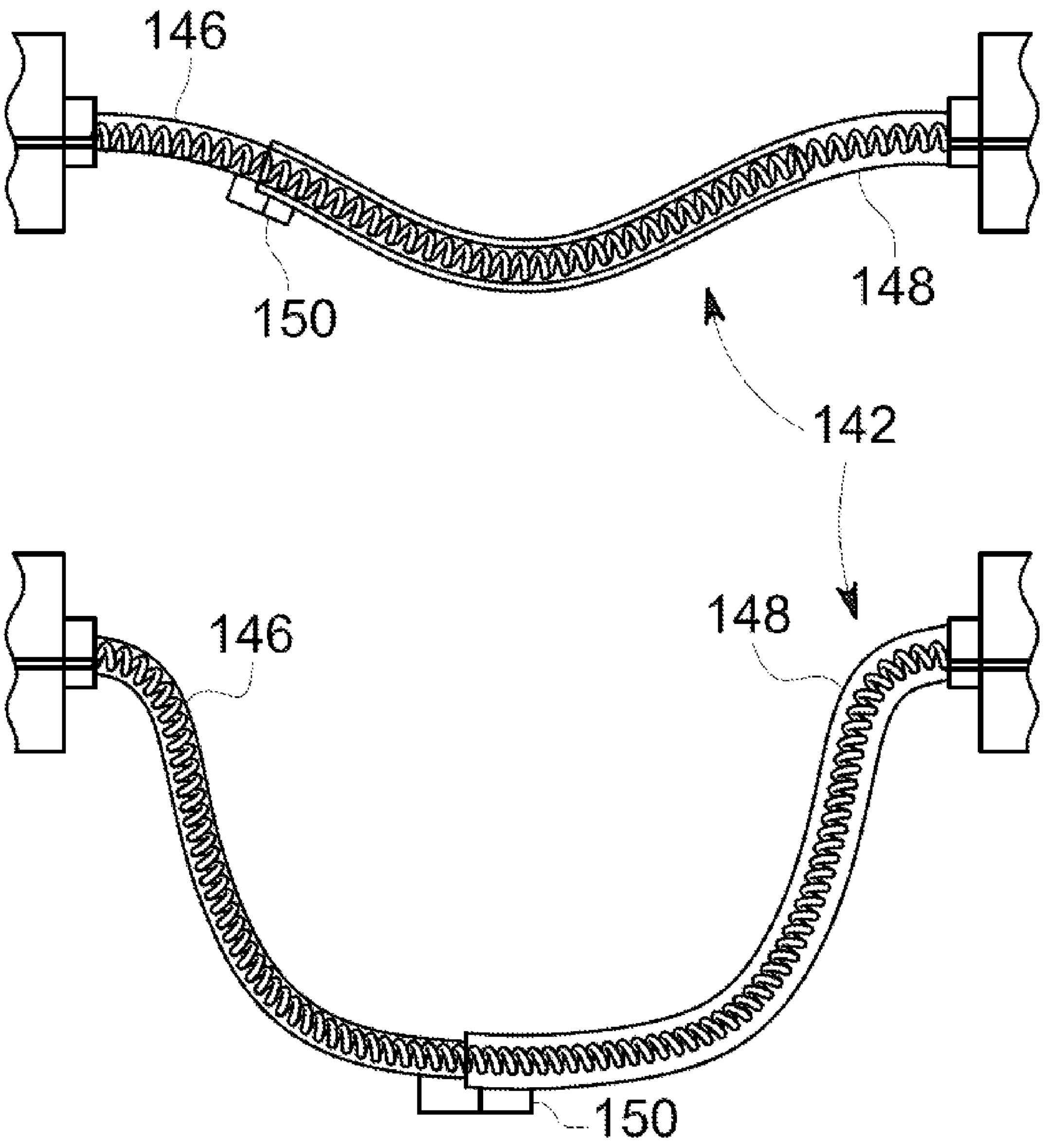
FIG. 29 shows an adjustable strap used in the respirator of FIG. 1 or FIG. 10.

In one embodiment as shown in FIG. 29, the adjustable neck band 142 or head band may comprise a cable 140 that provide electrical power to the blower. In one embodiment, the cable 140 is a coiled cable which is compressible and extensible. In one embodiment, the neck band 142 or head band comprises an inner sleeve 146, an outer sleeve 148 and a latch 150.

The neck band 142/head band is able to retract and extend to suit the size of the necks and heads of most users, and the adjustment can be done easily, where the position can be latched once the adjustment is satisfactory. The neck band 142/head band can be positioned on top the head, or on back of the neck, or anywhere in between.

In another embodiment as shown in FIG. 30, an inhalation one-way valve is fitted to the end of the thread connector 46 to stop breathed air going back to the filter unit 14.

In another embodiment as shown in FIGS. 31, 45, and 46, a drain valve is added at the bottom of the mask 40 to allow accumulated condensation or sweat to drain away. The position of the valve makes minimum impact on the general appearance of the mask.

Referring to FIGS. 32 to 35, another preferred embodiment of the present invention is presented. In this embodiment of the present invention, there is provided a modular respirator 10 comprising an elongate filter unit 14 having a stud connector 79 and thread connectors 62. The modular respirator 10 comprises an elongate controlling unit 26 having a thread connector at both ends of the unit.

The modular respirator 10 further comprises a mask assembly 12 having a mask for covering the oral and nasal passage of a user, at least one exhalation assembly 203, a mask inlet tread connector 46 at one end of the mask, a mask quick connect interface 30 at an opposite end of the mask, wherein the mask inlet is releasably fastened to the thread connector 62, and the mask quick connect interface 30 is releasably fastened to the stud connector 79.

The modular respirator 10 further comprising a blower unit 22 located at the back of the neck, having a thread connector 202 at each end of the unit, a blower 108, an electric cable 201 and an air pipe 204. The blower unit 22 connects between the filter unit 14 and the control unit 26.

Figure 32:
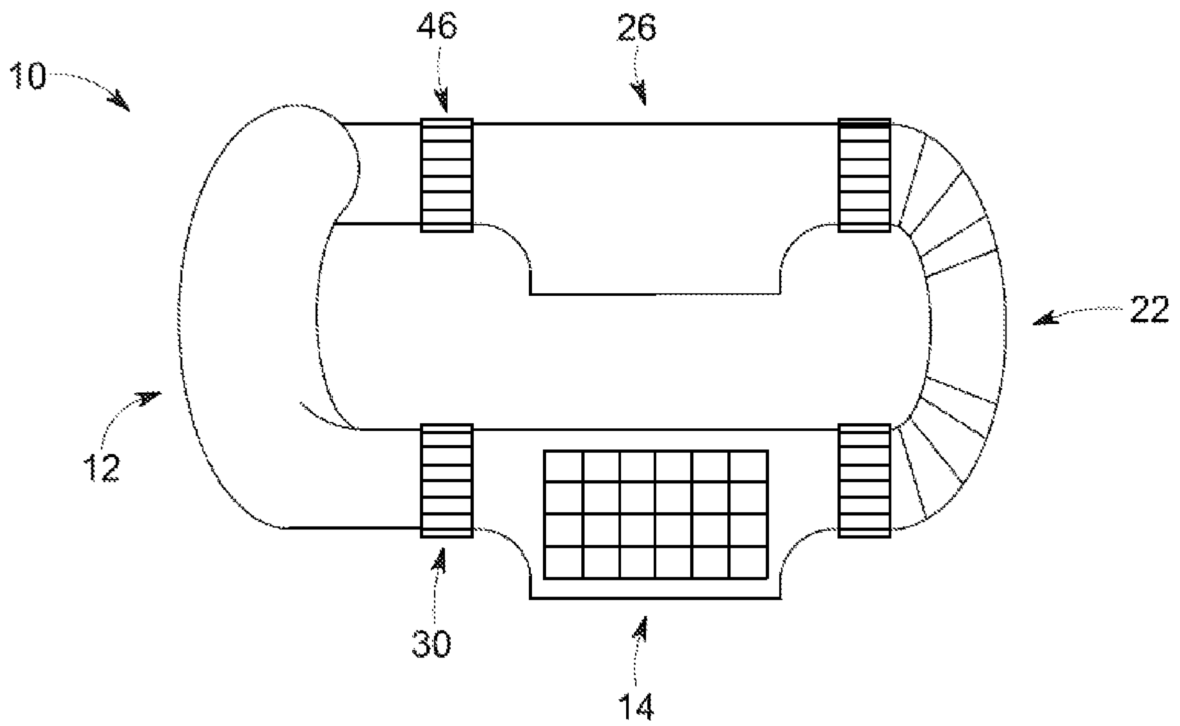
FIG. 32 shows a schematic perspective view of a respirator in power version of another embodiment of the present invention.
Figure 33:
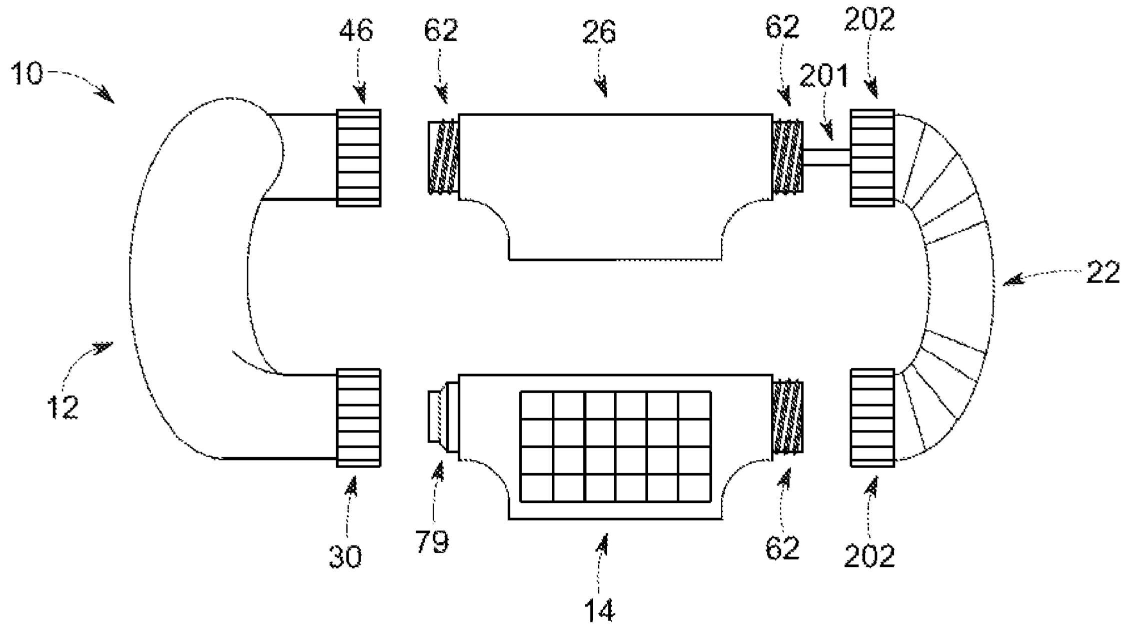
FIG. 33 shows a schematic exploded view of the respirator of FIG. 32.

In one embodiment as shown in FIGS. 32, and 33, the filter unit 14 has a replaceable rectangular filter element and a pre-filter.

Figure 34:
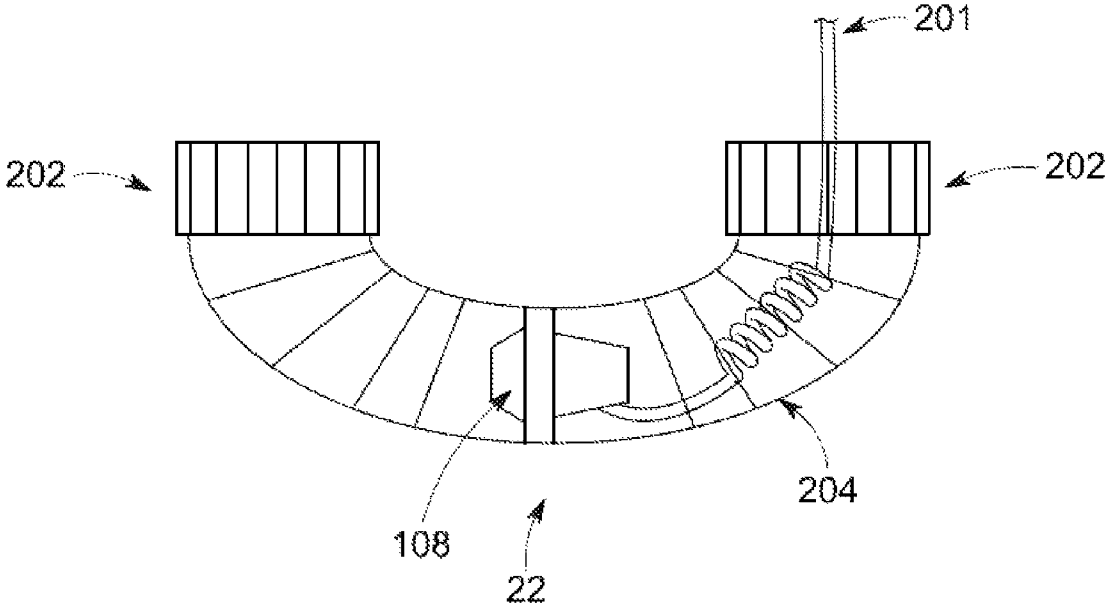
FIG. 34 shows a schematic section view of a blower unit of the respirator in FIG. 32.
Figure 35:
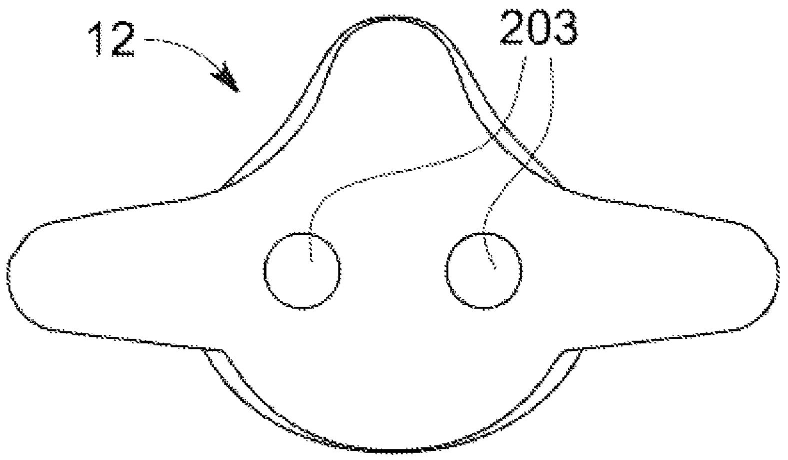
FIG. 35 shows a front view of a mask assembly of the respirator in FIG. 32.
Figure 36:
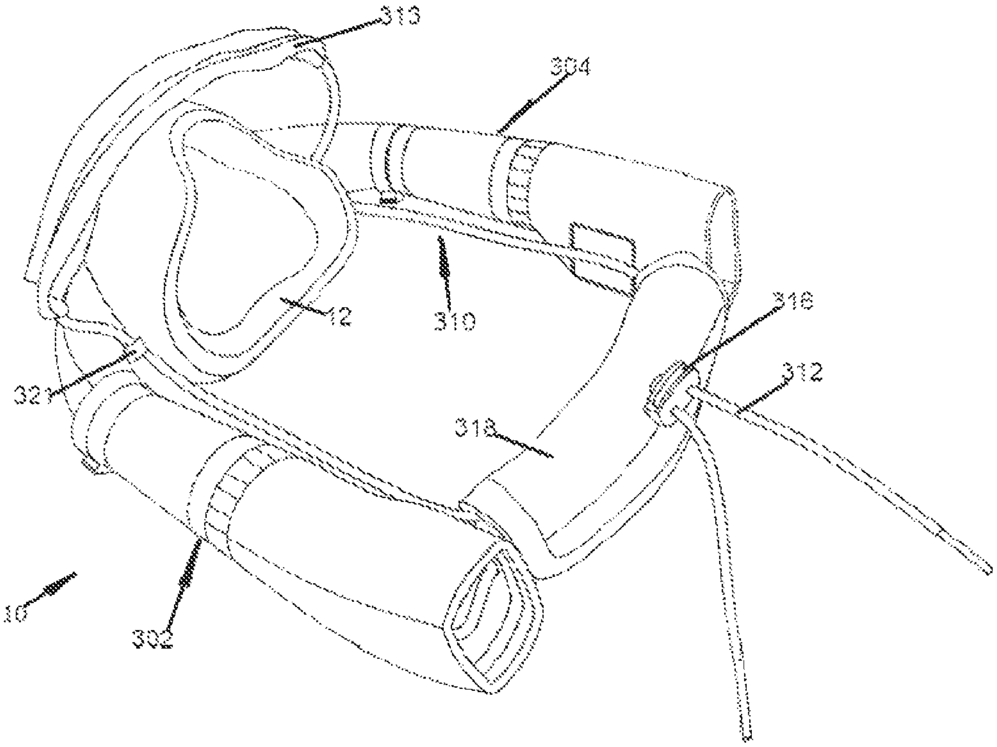
FIG. 36 shows a view of a respirator having a single string strap in accordance an embodiment of the present invention.
Figure 37:
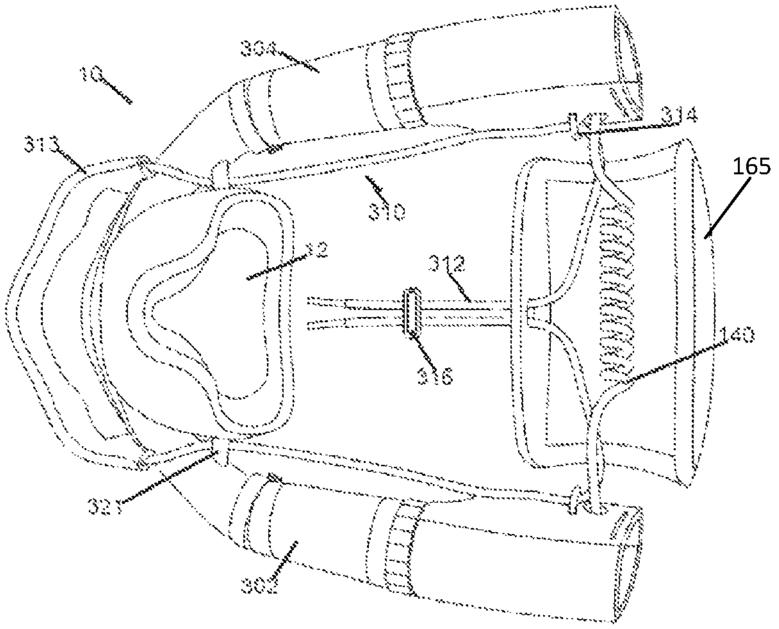
FIG. 37 shows another view of the respirator of FIG. 36 with a Velcro based cover in open position.
Figure 38:
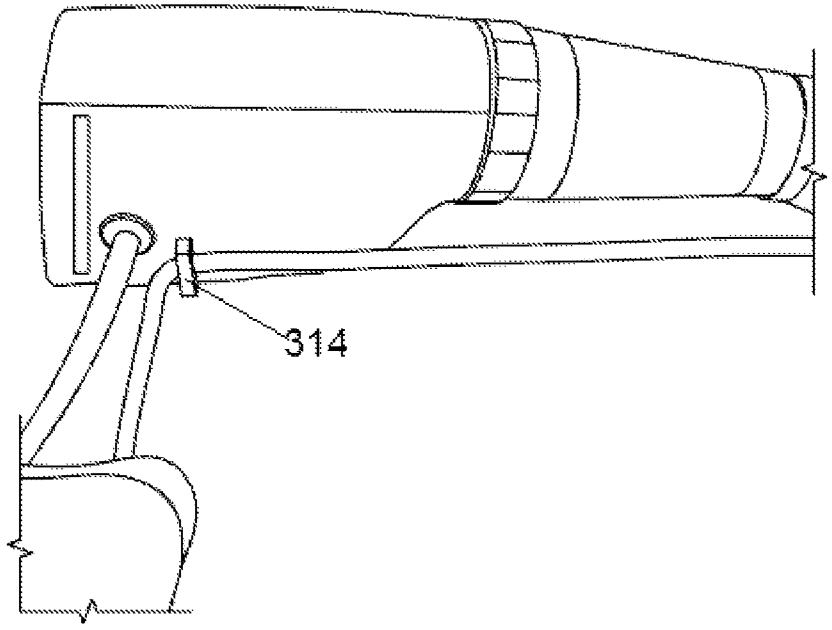
FIG. 38 shows a schematic view of a hook for the respirator of FIG. 36.
Figure 39:
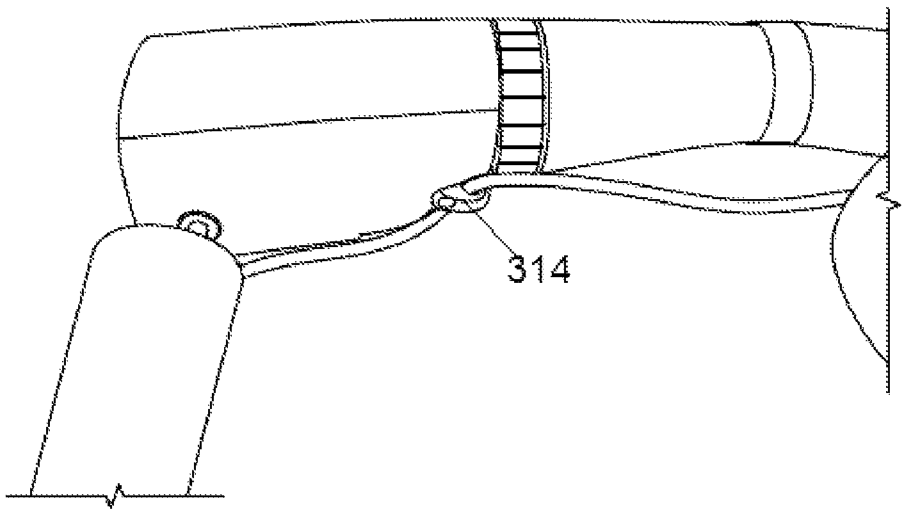
FIG. 39 shows a schematic view of another hook for the respirator of FIG. 36.

In one embodiment as shown in FIGS. 32, 33 and 34, the mask quick connector 30 has a blocking end to prevent air from entering into the mask. When the blower 108 runs, air comes in from the filter unit 14, entering the blower unit 22, then the control unit 26 before entering the mask assembly 12. Donning and doffing respirator 10 can be easily done via the quick connector 30.

In one embodiment as shown in FIG. 34, the air pipe 204 is made of rubber having a section of bellows at each end which is compressible and extensible. The elastic nature of the air pipe 204 also functions as part of the fastening mechanism to secure the respirator 10 around the head.

In one embodiment as shown in FIGS. 33 and 34, the electric cable 201 is a coiled cable which is compressible and extensible.

In one embodiment as shown in FIGS. 23, 32, and 33, the controlling unit 26 comprises a control PCB, a battery 24, and a casing having a sealed air path between an inlet thread connector 62 and an outlet thread connector 62 of the unit.

Referring to FIG. 33, the thread connector 62 can be also a stud connector 79; and likewise the thread connector 46 can be also a quick connect interface 30.

In one embodiment, the controlling unit 26 has a thread connector at an inlet end and a push-fit connector at an outlet end; the mask assembly has a quick connect interface at each end of the mask. The air pipe 204 may comprise a thread connector assembly adapted to adjust a length of the air pipe and to releasably fasten to the controlling unit and the filter unit.

In another embodiment, the mask inlet connector can be a thread connector or a Quick Connect (push-fit) connector; an adjustable threaded connector assembly to adjust the length of the air pipe.

The respirator described in this embodiment is more suitable for heavy dust environment, such as in industrial settings.

The present invention can be utilised in many applications, including but not limited to:

- Sports respiratory muscle training.
- Air pollution protection in domestic environment.
- For Chronic obstructive pulmonary disease (COPD) patients to strengthen their inspiratory muscles, thus help them improve breathing and their wellbeing.
- In hospital for doctors, nurses and patients cross-infection protection.
- Breathing technique related training.
- Breathing data collection, analytics and display.
- Industrial respiratory protection.

Reference is now made to FIGS. 36 to 45. In one embodiment of the present invention, there is provided a respirator 10 having a single string strap for replacing the pull-over bands 48. In this embodiment, the respirator 10 comprising a mask 12, a left-side assembly 302, a right-side assembly 304, and a single string strap assembly 310. The left-side assembly 302 is connected to the right-side assembly 304 through a cable assembly 318 at one end, and a mask assembly 12 at the other end.

In one embodiment, the mask assembly 12 comprises a bridge structure 321 linking the mask body with an air passing channel 322. The bridge structure 321 is disposed at a location approximately along the line intersecting with the centre of gravity of the mask assembly 12. Preferably, a bridge structure 321 is adapted to form a loop with an air passing channel 322 and the mask body.

The single string strap assembly 310 comprises a single string 312, a pad 313, a latch 316, On the left-side assembly 302 and the right-side assembly 304, there are hook 314 through which the single string 312 passes. In one preferred embodiment, the single string 312 passes through a hook 314 on the left-side assembly 302, then a loop formed by a bridge structure 321 and a left air passing channel 322, then a head pad 313, then another loop formed by a bridge structure 321 and a right air passing channel 322, and then another hook 314 on the right-side assembly 304.

Hence, the single string strap assembly 310 works in such a way that, the single string forms a closed loop with one end with the head pad 313 adapted to be placed on the back of a user's head, and the other end being located at the back of the user's neck. When two opposite ends of the single string 312 are pulled through latch 316, a combined pulling force acts on the line intersecting the centre of gravity of the mask assembly 12. As a consequence, the pulling force of the single string 312 turns to an action of pushing the mask body to the user's face. In one embodiment, when the pulling force does not act on the line intersecting the centre of gravity of the mask assembly, the pushing force induced on the mask body would not be evenly distributed. Then two separate strings would be needed, as would most conventional masks.

Further, once the single string 312 is tightened, it induces a pulling force to pull the left-side assembly 302 and the right-side assembly 304. Hence the single string strap assembly 310 of an embodiment of the present invention is adapted to work as if there are 3 separate fastening strings, thus greatly simplifies the fastening system. towards the neck, acting similarly to a separate fastening string.

In one embodiment of the respirator 10, the cable assembly 318 has a coiled cable 140. In another embodiment of the respirator 10, the cable assembly 318 can be replaced by an adjustable band as shown in FIG. 29. In yet another embodiment of the respirator 10, there is no cable assembly nor adjustable band linking between the left-side assembly 302 and the right-side assembly 304.

In another embodiment, the hooks 314 of the respirator 10 can be located at other locations of the left-side assembly 302 and the right-side assembly 304.

Figure 40:
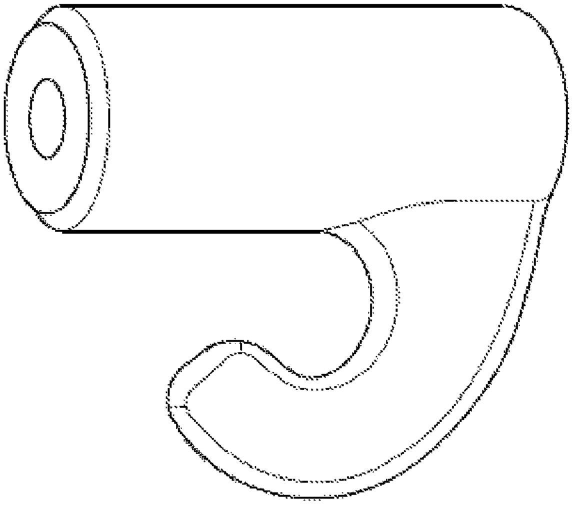
FIG. 40 shows a schematic perspective view of a hook used in the embodiment shown in FIG. 39.
Figure 41:
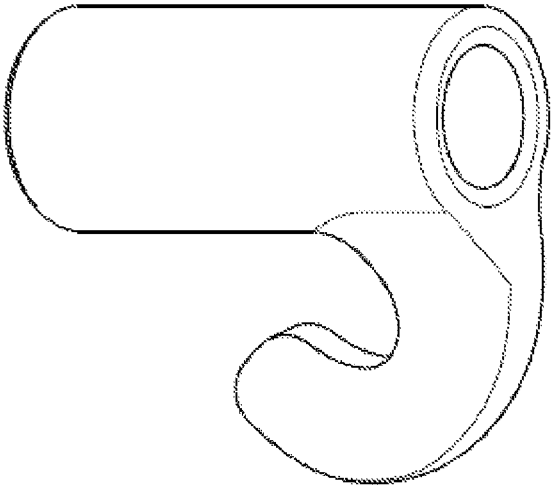
FIG. 41 shows another schematic perspective view of the hook of FIG. 40.
Figure 42:
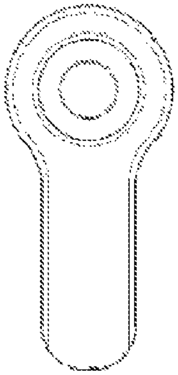
FIG. 42 shows a schematic back view of the hook of FIG. 40.
Figure 43:
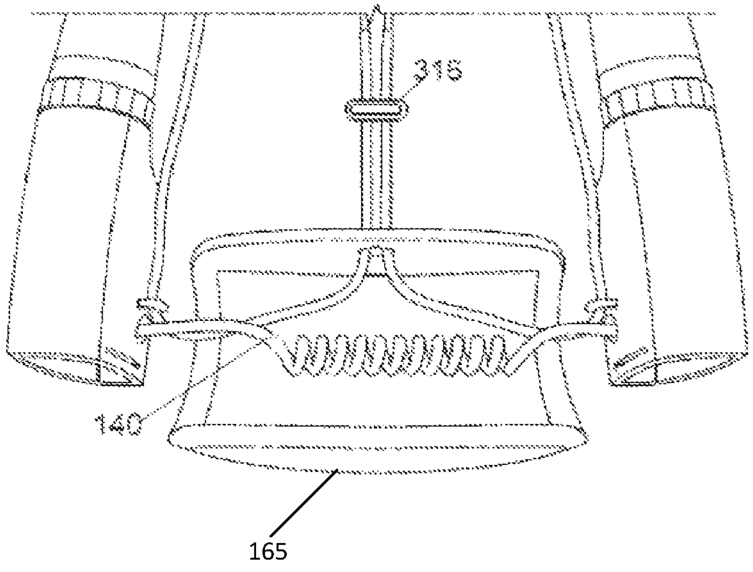
FIG. 43 shows a schematic view of back strap in opened configuration of the respirator of FIG. 36.
Figure 44:
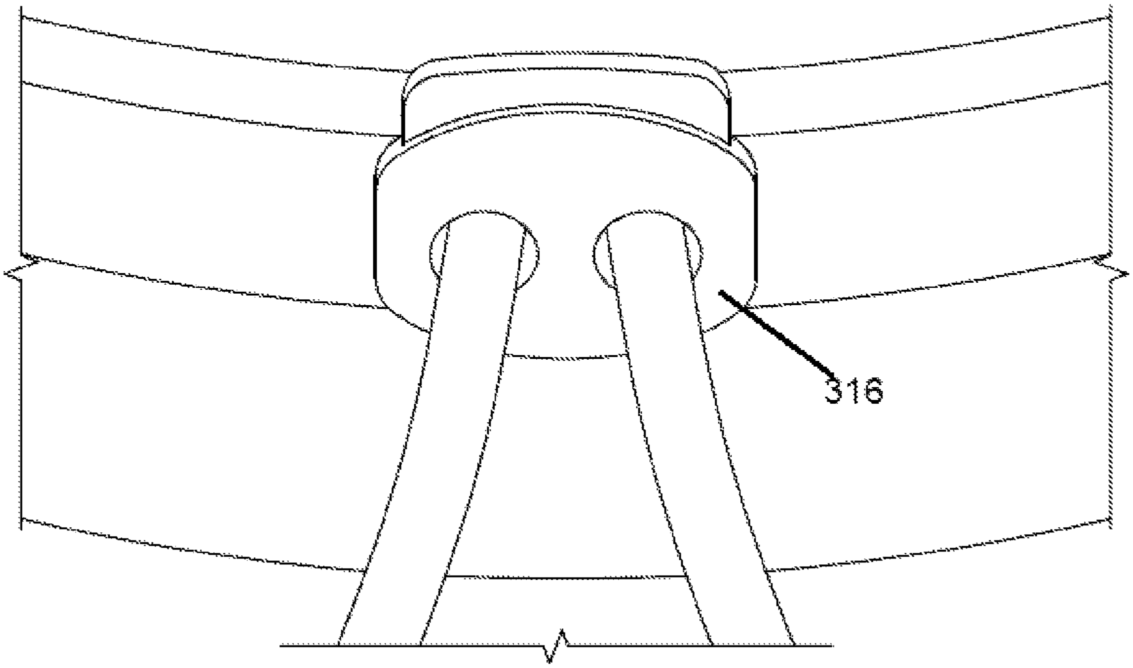
FIG. 44 shows a schematic view of a latch for the respirator of FIG. 36.

In an embodiment where the left-side assembly 302 and the right-side assembly 304 are too heavy, a separate supporting string or strap may be needed for each of the left-side assembly 302 and the right-side assembly 304 to secure the respirator 10 on the head In a preferred embodiment, the hook 304 is a separate part that can be secured to the casing of the left-side assembly 302 and right-side assembly 304 as shown in FIGS. 40 to 42. The hook 304 may be positioned in a concealed location so that it will not scratch the cheek of the user. In one embodiment as shown in FIGS. 40 to 42, the hook 314 is adapted to be secured to the respirator using screw. The screw that is used to tighten the hook 314 can also be used to tighten the casing that the hook is attached to.

Figure 48:
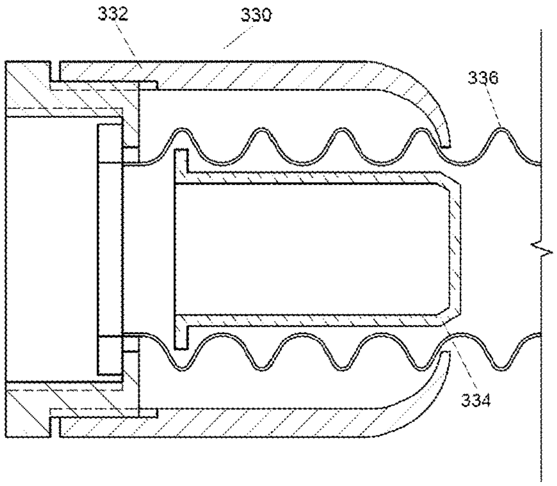
FIG. 48 shows a schematic section view of a thread connector assembly with an adjusting mechanism in a relax state.
Figure 49:
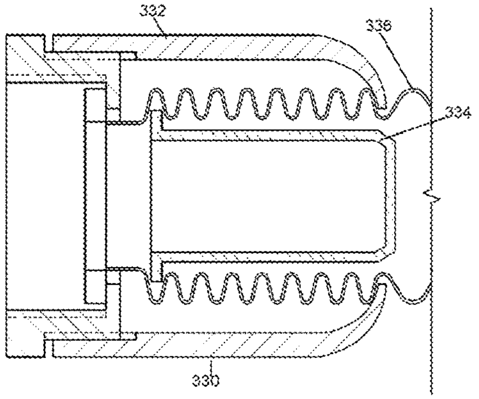
FIG. 49 shows a schematic section view of a thread connector assembly of FIG. 48 in a compressed state.
Figure 50:
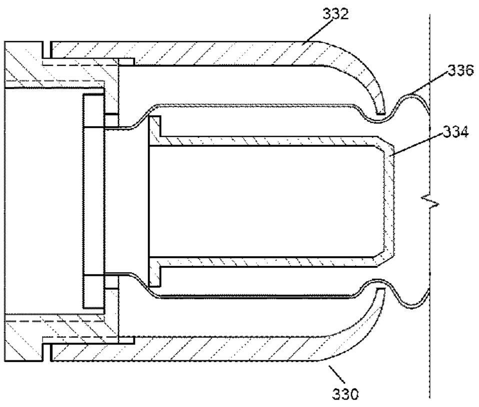
FIG. 50 shows a schematic section view of a thread connector assembly of FIG. 48 in a stretched state.

In one embodiment as shown in FIGS. 48 to 50, there is provided a thread connector assembly 330 for replacing the thread connector 202. The thread connector assembly 330 comprises a threaded adjusting ring 332 coupled with a bush collar 334 adapted to hold an adjustable number of corrugations. The bush collar in FIG. 48, 49 50 has an opening at the end facing the blower, so air can pass through. By adjusting the effective length of an air pipe can achieve a good fit of the respirator 10 according to the neck size of the user. By doing so, the air pipe works more effectively as part of the fastening mechanism for the respirator.

FIG. 48 shows the bellows 336 in the relaxed state, FIG. 49 shows the bellows 336 in compressed state, and FIG. 50 shows the bellows 336 in stretched state.

Further, in one embodiment of the present invention, it is used for asthma patients. By restricting breathing, an embodiment of the present invention can be beneficial to help asthma patients correct their "bad" breathing habit and breathe less air, and eventually reduce the attacks and improve their wellbeing. In an embodiment of the present invention, it can reduce the chances for an asthma attack if patients wear it to do exercise.

In one embodiment of the present invention, it is differed to the traditional respirator concept that the traditional respirator is design for air pollution protection only.

Although the invention has been described with reference to specific examples, it will be appreciated by those skilled in the art that the invention may be embodied in many other forms, in keeping with the broad principles and the spirit of the invention described herein.

The present invention and the described embodiments specifically include the best method known to the applicant of performing the invention. The present invention and the described preferred embodiments specifically include at least one feature that is industrial applicable.

The invention claimed is:

1. A multifunctional modular respirator comprising:

an elongate filter unit having a push-fit connector filter inlet, a thread-connector filter outlet, and a replaceable fluid filter for filtering pollutants within the fluid;

an elongate exhaust unit having a thread-connector exhaust inlet, an exhaust outlet, one or more one-way valves, a replaceable exhaust filter, and an air-sensing push-fit connector;

an interchangeable programmable air flow generator assembly; and a mask assembly having a mask for covering the oral and nasal passage of a user, a threaded mask inlet at one end of the mask, a threaded mask outlet at an opposite end of the mask, wherein the mask inlet is releasably fastened to the filter outlet, and the mask outlet is releasably fastened to the exhaust inlet;

such that the filter unit is located on one side of a neck of the user and the exhaust unit is located on an opposite side of the neck of the user, wherein the filter unit, the mask, and the exhaust unit jointly form a tightly sealed passage for the fluid to pass therethrough;

wherein the filter inlet is connected to a first end of the interchangeable programmable air flow generator assembly via a push-fit connector with a spring-loaded ring for connector release;

wherein the exhaust unit is connected to a second end of the interchangeable programmable air flow generator assembly via a push-fit connector with a spring-loaded ring for connector release;

wherein the multifunctional modular respirator is configured to operate as at least one of a powered air purifying respirator (PAPR), an air purifying respirator (APR), a programmable inhalation resistance training respirator;

wherein the interchangeable programmable air flow generator assembly is programmed to maintain a positive pressure and positive flow required when the multifunctional modular respirator is operating as the PAPR, and wherein the interchangeable programmable air flow generator is programmed to maintain an adjustable negative pressure and reverse flow when the multifunctional modular respirator is operating as the programmable inhalation resistance training respirator;

wherein a single string strap assembly is configured to fasten the mask assembly to a head and the neck of the user;

wherein the mask assembly comprises a cooperating bridge linking a mask body with each end of the mask; wherein the bridge forms a loop to allow a single string of the single string strap assembly to pass through;

wherein the single string strap assembly comprises: the single string, a pad, and a latch;

wherein the single string forms a closed loop with one end of the closed loop located at the pad adapted to be placed on a back of the head of the user; and a second end being located at the back of the neck of the user; and wherein two opposite ends of the single string are pulled through the latch to form the closed loop.

2. The multifunctional modular respirator of claim 1, wherein the interchangeable programmable air flow generator assembly comprises: a blower unit having a blower inlet, a blower outlet and an electric blower for driving the fluid from the blower inlet to the blower outlet;

and a controlling unit having a power unit and a controller for controlling the electric blower, wherein the blower outlet is releasably connected with the filter inlet of the filter unit by a female push-fit connector with a spring-loaded ring for connector release, and the controlling unit is releasably connected to the exhaust unit by a female push-fit connector with a spring-loaded ring for connector release.

3. The multifunctional modular respirator of claim 2, wherein the electric blower contains an electric motor that comprises a stator with a plurality of protruding ribs at both ends of the stator and an outer surface of the stator, wherein a shape of each of the ribs at both ends of the stator is in a triangle, such that a gap between adjacent windings on an inner wall of a core of the motor is minimized.

4. The multifunctional modular respirator of claim 3, wherein the electric motor generates air flow through an impeller, wherein the motor comprises a plurality of motor outer surface vanes for supporting the motor inside the electric blower and directing the fluid to pass therethrough, wherein the impeller is configured to generate positive air flow when the multifunctional modular respirator is operating as the PAPR, and wherein the impeller is configured to generate reverse air flow when the multifunctional modular respirator is operating as the programmable inhalation resistance training respirator and the motor rotates in a reverse direction.

5. The multifunctional modular respirator of claim 1, wherein the replaceable fluid filter has a conical shape and the filter outlet comprises a pipe thread joint for fastening a corresponding pipe thread joint on the inlet of the mask assembly.

6. The multifunctional modular respirator of claim 1, wherein the filter unit comprises a male push-fit connector for connecting a complementary female push-fit connector with the spring-loaded ring for the connector release.

7. The multifunctional modular respirator of claim 6, wherein the male push-fit connector comprises a stud having a locking groove for receiving the complementary female push-fit connector with the spring-loaded ring for the connector release.

8. The multifunctional modular respirator of claim 7, wherein the female push-fit connector with the spring-loaded ring for the connector release comprises a socket adapted to having a spring for engaging with the locking groove of the stud to releasably engage with the stud, and a ring with one or more latches for the spring to form a spring-loaded latch, and wherein by rotating the ring, the spring comes out of the locking groove of the stud allowing the stud to release from the male push-fit connector.

9. The multifunctional modular respirator of claim 1, wherein the exhaust unit comprises a pipe thread connector at the exhaust inlet end for connecting to a complimentary pipe thread connector at the mask outlet; wherein at the other end of the exhaust unit is a male push-fit connector adapted to engage a complimentary female push-fit connector with the spring-loaded ring for the connector release.

10. The multifunctional modular respirator of claim 1, wherein a CO2 sensor is adapted to measure CO2 concentration level via the air-sensing push-fit connector of the exhaust unit.

11. A multifunctional modular respirator comprising:

an elongate filter unit having a push-fit connector filter inlet, a thread-connector filter outlet, and a replaceable fluid filter for filtering pollutants within the fluid;

an elongate exhaust unit having a thread-connector exhaust inlet, an exhaust outlet, one or more one-way valves, a replaceable exhaust filter, and an air-sensing push-fit connector;

an interchangeable programmable air flow generator assembly; and a mask assembly having a mask for covering the oral and nasal passage of a user, a threaded mask inlet at one end of the mask, a threaded mask outlet at an opposite end of the mask, wherein the mask inlet is releasably fastened to the filter outlet, and the mask outlet is releasably fastened to the exhaust inlet;

such that the filter unit is located on one side of a neck of the user and the exhaust unit is located on an opposite side of the neck of the user, wherein the filter unit, the mask, and the exhaust unit jointly form a tightly sealed passage for the fluid to pass therethrough;

wherein the filter inlet is connected to a first end of the interchangeable programmable air flow generator assembly via a push-fit connector with a spring-loaded ring for connector release;

wherein the exhaust unit is connected to a second end of the interchangeable programmable air flow generator assembly via a push-fit connector with a spring-loaded ring for connector release;

wherein the multifunctional modular respirator is configured to operate as at least one of a powered air purifying respirator (PAPR), an air purifying respirator (APR), a programmable inhalation resistance training respirator;

wherein the interchangeable programmable air flow generator assembly is programmed to maintain a positive pressure and positive flow required when the multifunctional modular respirator is operating as the PAPR;

wherein the interchangeable programmable air flow generator assembly is programmed to maintain an adjustable negative pressure and reverse flow when the multifunctional modular respirator is operating as the programmable inhalation resistance training respirator;

wherein the interchangeable programmable air flow generator assembly comprises: a blower unit having a blower inlet, a blower outlet and an electric blower for driving the fluid from the blower inlet to the blower outlet; and a controlling unit having a power unit and a controller for controlling the electric blower, wherein the blower outlet is releasably connected with the filter inlet of the filter unit by a female push-fit connector with a spring-loaded ring for connector release, and the controlling unit is releasably connected to the exhaust unit by a female push-fit connector with a spring-loaded ring for connector release; and wherein the interchangeable programmable air flow generator assembly comprises:

an adjustable neck band joining the blower unit and the controlling unit;

wherein the controlling unit is adapted to supply power to the electric blower via a coiled cable passing through the adjustable neck band; and wherein the adjustable neck band comprises an inner sleeve joining one of the blower unit and controlling unit, an outer sleeve with a latch joining the corresponding blower unit or controlling unit such that the inner sleeve is movable within the outer sleeve, with the latch for fastening the inner sleeve with the outer sleeve on a fixed position.

12. The multifunctional modular respirator of claim 11, wherein the mask assembly further comprises one or more hooks located towards a left or a right of the mask assembly, wherein the one or more hooks are adapted to engage with pull-over bands for securing the mask assembly on the user.

13. The multifunctional modular respirator of claim 11, wherein the electric blower contains an electric motor that comprises a stator with a plurality of protruding ribs at both ends of the stator and an outer surface of the stator, wherein a shape of each of the ribs at both ends of the stator is in a triangle, such that a gap between adjacent windings on an inner wall of a core of the motor is minimized.

14. The multifunctional modular respirator of claim 13, wherein the electric motor generates air flow through an impeller, wherein the motor comprises a plurality of motor outer surface vanes for supporting the motor inside the electric blower and directing the fluid to pass therethrough, wherein the impeller is configured to generate positive air flow when the multifunctional modular respirator is operating as the PAPR, and wherein the impeller is configured to generate reverse air flow when the multifunctional modular respirator is operating as the programmable inhalation resistance training respirator and the motor rotates in a reverse direction.

15. The multifunctional modular respirator of claim 11, wherein the replaceable fluid filter has a conical shape and the filter outlet comprises a pipe thread joint for fastening a corresponding pipe thread joint on the inlet of the mask assembly.

16. The multifunctional modular respirator of claim 11, wherein the filter unit comprises a male push-fit connector for connecting a complementary female push-fit connector with the spring-loaded ring for the connector release.

17. The multifunctional modular respirator of claim 16, wherein the male push-fit connector comprises a stud having a locking groove for receiving the complementary female push-fit connector with the spring-loaded ring for the connector release.

18. The multifunctional modular respirator of claim 17, wherein the female push-fit connector with the spring-loaded ring for the connector release comprises a socket adapted to having a spring for engaging with the locking groove of the stud to releasably engage with the stud, and a ring with one or more latches for the spring to form a spring-loaded latch, and wherein by rotating the ring, the spring comes out of the locking groove of the stud allowing the stud to release from the male push-fit connector.

19. The multifunctional modular respirator of claim 11, wherein the exhaust unit comprises a pipe thread connector at the exhaust inlet end for connecting to a complimentary pipe thread connector at the mask outlet; wherein at the other end of the exhaust unit is a male push-fit connector adapted to engage a complimentary female push-fit connector with the spring-loaded ring for the connector release.

20. The multifunctional modular respirator of claim 11, wherein a CO2 sensor is adapted to measure CO2 concentration level via the air-sensing push-fit connector of the exhaust unit.

* * * * *